United States Patent
Choi

(10) Patent No.: US 10,282,078 B2
(45) Date of Patent: May 7, 2019

(54) WEARABLE TERMINAL AND METHOD FOR SETTING INPUT VOICE INFORMATION WITH A SET ALARM TIME

(71) Applicant: LG ELECTRONICS INC., Seoul (KR)

(72) Inventor: Kyungdong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 295 days.

(21) Appl. No.: 14/857,510

(22) Filed: Sep. 17, 2015

(65) Prior Publication Data
US 2016/0283094 A1    Sep. 29, 2016

(30) Foreign Application Priority Data

Mar. 23, 2015  (KR) .................. 10-2015-0040226

(51) Int. Cl.
| | | |
|---|---|---|
| *G06F 1/16* | (2006.01) | |
| *G06F 3/0484* | (2013.01) | |
| *G06F 3/0481* | (2013.01) | |
| *G04G 21/08* | (2010.01) | |
| *G06F 3/0488* | (2013.01) | |
| *G04C 3/00* | (2006.01) | |
| *G06F 3/0486* | (2013.01) | |

(52) U.S. Cl.
CPC ......... *G06F 3/04847* (2013.01); *G04C 3/001* (2013.01); *G04G 21/08* (2013.01); *G06F 1/163* (2013.01); *G06F 3/0488* (2013.01); *G06F 3/04817* (2013.01); *G06F 3/04842* (2013.01); *G06F 3/0486* (2013.01)

(58) Field of Classification Search
CPC .. G06F 3/04847; G06F 1/163; G06F 3/04817; G06F 3/04842; G06F 3/0488; G06F 3/0486; G06F 3/0416; G04G 21/08
See application file for complete search history.

(56) References Cited

U.S. PATENT DOCUMENTS

| | | | |
|---|---|---|---|
| 6,477,117 B1 * | 11/2002 | Narayanaswami | .. G04G 13/026 368/224 |
| 2008/0186808 A1 | 8/2008 | Lee | |
| 2010/0157742 A1 | 6/2010 | Relyea et al. | |
| 2013/0139084 A1 | 5/2013 | Han | |
| 2014/0269224 A1 | 9/2014 | Huh et al. | |

(Continued)

FOREIGN PATENT DOCUMENTS

| | | |
|---|---|---|
| EP | 2 838 008 A2 | 2/2015 |
| KR | 10-2010-0088858 A | 8/2010 |
| KR | 10-2015-0019875 A | 2/2015 |

*Primary Examiner* — Jennifer N To
*Assistant Examiner* — Amy P Hoang
(74) *Attorney, Agent, or Firm* — Birch, Stewart, Kolasch & Birch, LLP

(57) ABSTRACT

A mobile terminal including a main body configured to be wearable on a wrist; a touch screen provided on a front surface of the main body and configured to display a first graphic object corresponding to an hour hand and a second graphic object corresponding to a minute hand; and a controller configured to perform a first function associated with the first graphic object in response to a first preset touch being applied to the first graphic object, and perform a second function different than the first function in response to a second preset touch being applied to the second graphic object.

14 Claims, 26 Drawing Sheets

(56) References Cited

U.S. PATENT DOCUMENTS

| | | | | |
|---|---|---|---|---|
| 2014/0325410 A1* | 10/2014 | Jung | .................. | G06F 3/0488 |
| | | | | 715/765 |
| 2015/0049033 A1 | 2/2015 | Kim et al. | | |
| 2015/0105125 A1* | 4/2015 | Min | .................. | G04G 21/04 |
| | | | | 455/566 |
| 2015/0227245 A1* | 8/2015 | Inagaki | ............... | G06F 3/0412 |
| | | | | 345/173 |
| 2015/0348495 A1* | 12/2015 | Kim | .................. | G06F 3/0484 |
| | | | | 345/156 |
| 2016/0054710 A1* | 2/2016 | Jo | .................... | G04G 21/00 |
| | | | | 715/763 |
| 2016/0179353 A1* | 6/2016 | Iskander | ............ | G06F 3/04847 |
| | | | | 715/765 |
| 2017/0147988 A1* | 5/2017 | Shin | .................. | G06F 1/163 |

* cited by examiner

WEARABLE TERMINAL AND METHOD FOR SETTING INPUT VOICE INFORMATION WITH A SET ALARM TIME

CROSS-REFERENCE TO RELATED APPLICATION

Pursuant to 35 U.S.C. § 119(a), this application claims the benefit of earlier filing date and right of priority to Korean Application No. 10-2015-0040226, filed on Mar. 23, 2015, the contents of which is incorporated by reference herein in its entirety.

BACKGROUND OF THE DISCLOSURE

1. Field of the Disclosure

This specification relates to a mobile terminal wearable on a wrist.

2. Background of the Disclosure

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can capture still images or moving images, play music or video files, play games, receive broadcast and the like, so as to be implemented as an integrated multimedia player.

In recent time, wearable mobile terminals are under active development, beyond the usual technique of a user grasping the mobile terminal. However, it is often difficult for the user to operate the wearable mobile terminal.

SUMMARY OF THE DISCLOSURE

Therefore, an aspect of the detailed description is to provide a mobile terminal, which allows a user to select and execute a desired function in an easier and more convenient manner, and a method for controlling the same.

Another aspect of the detailed description is to provide a mobile terminal, which allows a user to select and execute a desired function of the mobile terminal without a complicated process of executing many menu select screens, and a method for controlling the same.

Another aspect of the detailed description is to provide a mobile terminal, capable of providing an optimized UX/UI for a user to set an alarm-related function more easily and conveniently in a watch type mobile terminal among various wearable types, and a method for controlling the same.

To achieve these and other advantages and in accordance with the purpose of this specification, as embodied and broadly described herein, there is provided a mobile terminal including a main body configured to be wearable on a wrist, a touch screen provided on a front surface of the main body and configured to output a first graphic object corresponding to an hour hand and a second graphic object corresponding to a minute hand, and a controller configured to perform a function associated with one of the first and second graphic objects when a preset touch is applied to the one graphic object, wherein the controller performs a different function based on a type of the one graphic object with the preset touch applied thereto, of the first and second graphic objects.

To achieve these and other advantages and in accordance with the purpose of this specification, as embodied and broadly described herein, there is provided a method for controlling a mobile terminal, the method including outputting a first graphic object corresponding to an hour hand and a second graphic object corresponding to a minute hand, and performing a function associated with one of the first and second graphic objects, in response to a preset touch being applied to the one graphic object. The performing may include performing a first function associated with an alarm when the preset touch is applied to the first graphic object, and performing a second function associated with the alarm, different from the first function, when the preset touch is applied to the second graphic object.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
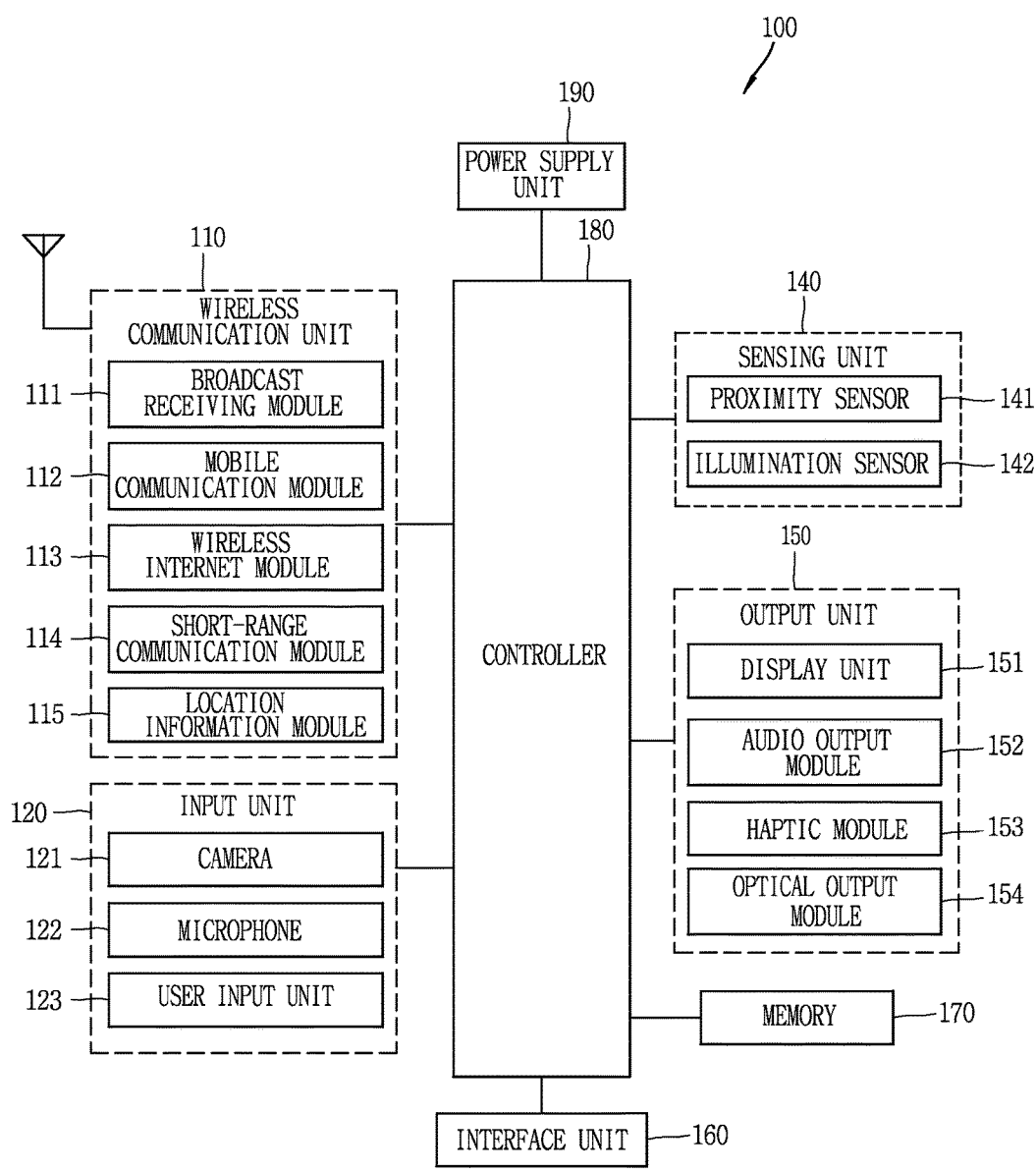
FIG. 1A is a block diagram of a mobile terminal according to an embodiment of the present disclosure.
Figure 1B:
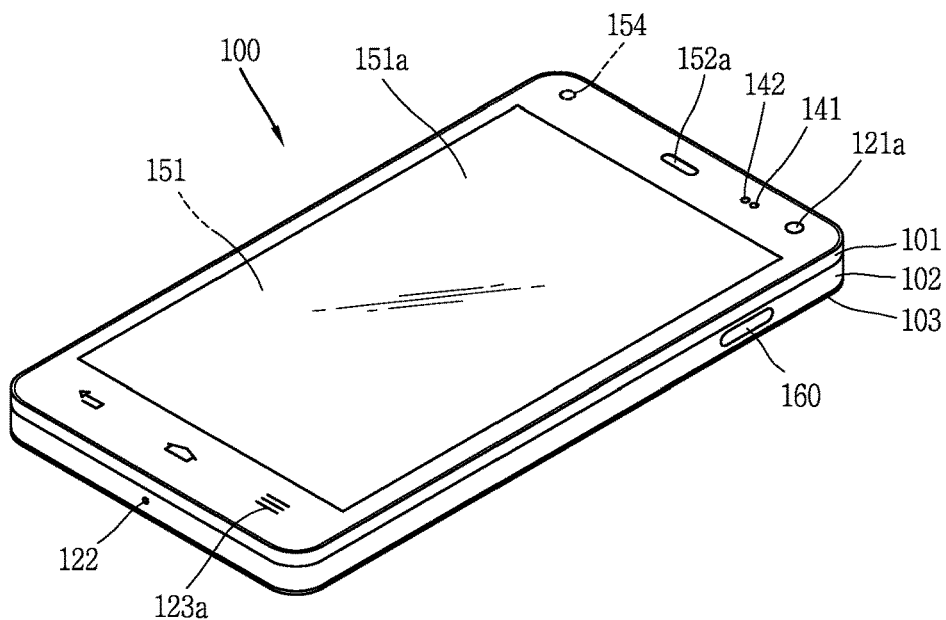
FIGS. 1B and 1C are conceptual views illustrating one example of the mobile terminal, viewed from different directions.
Figure 1C:
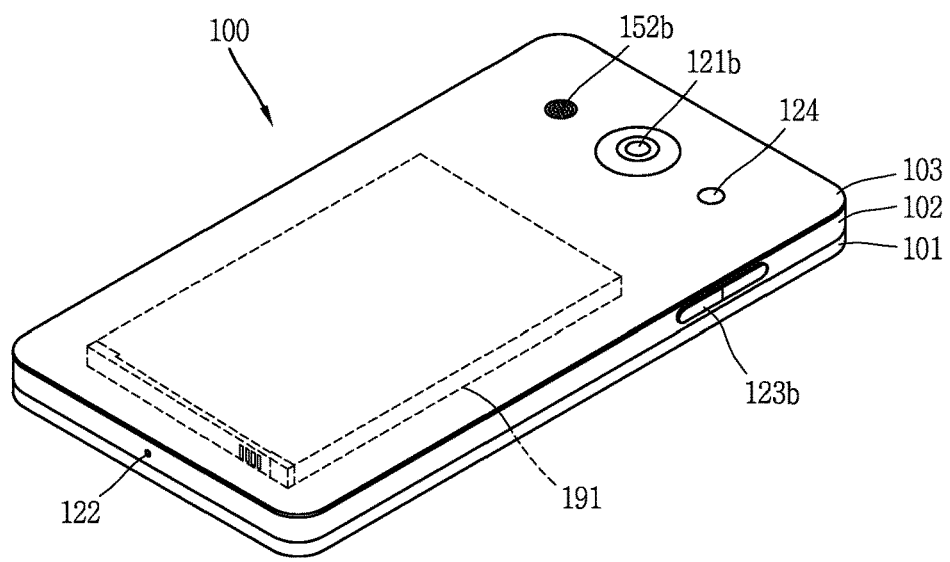

Reference is now made to FIGS. 1A to 1C, where FIG. 1A is a block diagram of a mobile terminal according to an embodiment of the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115. The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to faicilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like.

The wireless Internet module 113 may transmit/receive data according to one or more of such wireless Internet technologies, and other Internet technologies as well. In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor allows detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data can be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100.

The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control operations relating to application programs and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components are not limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities. A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, a mobile terminal may extend to a wearable device which is wearable on a human body. Such devices go beyond the usual technique of a user grasping the mobile terminal using his hand. Examples of the wearable device include a smart watch, a smart glass, a head mounted display (IHMD), and the like. Hereinafter, examples of the mobile terminals extended to the wearable devices will be described.

The wearable device can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
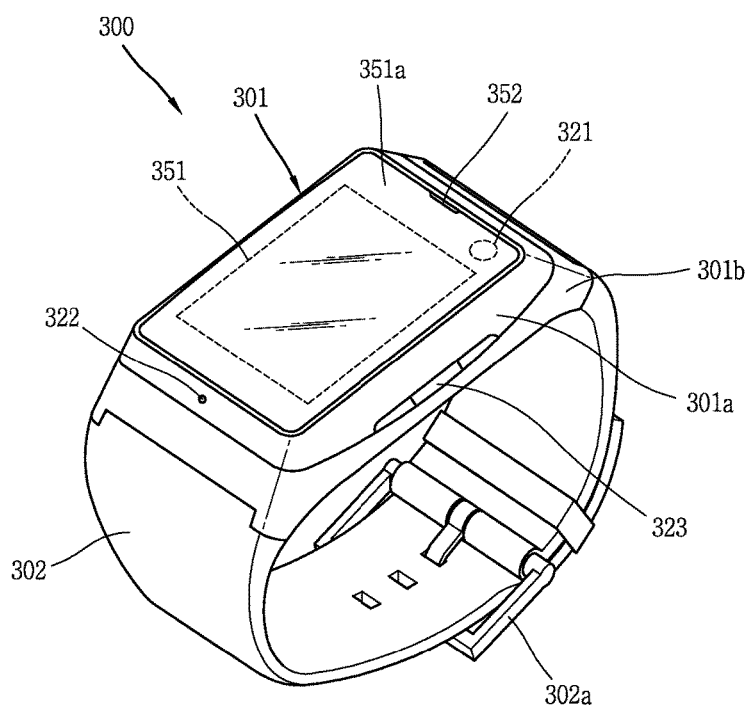
FIG. 2 is a perspective view illustrating one example of a watch-type mobile terminal in accordance with another exemplary embodiment.

FIG. 2 is a perspective view illustrating one example of a watch-type mobile terminal 300 in accordance with another exemplary embodiment. As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Hereinafter, description will be given of a control method which can be implemented in the mobile terminal and related embodiments with reference to the accompanying drawings. It will be understood by those skilled in the art that the present invention can be specified into other specific forms without departing from the spirit and essential features of the present invention.

Also, hereinafter, in description with reference to the accompanying drawings, when at least two images are shown in a form of 2 by 2 in one drawing (FIG. N), an image shown on a left upper side is referred to as "first drawing," an image shown on a right upper side is referred to as "second drawing," an image shown on a right lower side is referred to as "third drawing," and an image shown on a left lower side is referred to as "fourth drawing." Meanwhile, when at least two images are shown in one drawing (FIG. N) in series from top to bottom directions, those images are sequentially referred to as "first drawing, second drawing, . . . ," starting from the uppermost image. Also, when at least two images are shown in one drawing (FIG. N) in series from left-sided to right-sided directions, those images are sequentially referred to as "first drawing, second drawing, . . . ," starting from the leftmost image.

A mobile terminal according to one embodiment which may include at least one of those aforementioned components may be a watch-type mobile terminal as illustrated in FIG. 2. Hereinafter, description will be given of an example that a mobile terminal according to an embodiment of the present invention is a watch-type mobile terminal. However, the following description may not be limited to the watch-type mobile terminal, but be equally/similarly applicable to mobile terminals having a flexible display and various types of wearable devices (for example, a smart watch, a smart glass, a head mounted display (HMD), and the like).

Also, hereinafter, explaining an exemplary watch-type mobile terminal, the same/like reference numerals illustrated in FIGS. 1A to 1C will equally be used. A watch type mobile terminal 100 according to an embodiment of the present invention can exchange data with other terminals. Thus, the watch type mobile terminal 100 may include the wireless communication unit 110 illustrated in FIG. 1A. The mobile terminal can exchange data with another terminal through the wireless communication unit 110.

The data communication method between the watch type mobile terminal according to an embodiment of the present invention and another terminal may be various. For example, the data communication may be performed by using at least one of Bluetooth™, Radio Frequency IDentification (RFID), infrared Data Association (IrDA), Ukra-WideBand (UWB), ZigBee, Near Field Communication (NFC), Wireless-Fidelity (Wi-Fi), Wi-Fi Direct, Wireless USB (Wireless Universal Serial Bus), and the like. Also, the watch type mobile terminal 100 can perform wireless communication using the wireless communication unit 110. In more detail, the watch type mobile terminal itself may perform wireless communication as well as exchanging data with another mobile terminal 100.

Meanwhile, the watch type mobile terminal 100 may include a main body which is wearable on a wrist. Here, the main body may include a main body 301 and a band 302 described in FIG. 2. A touch screen 151 may be provided on a front surface of the main body 301.

Figure 4A:
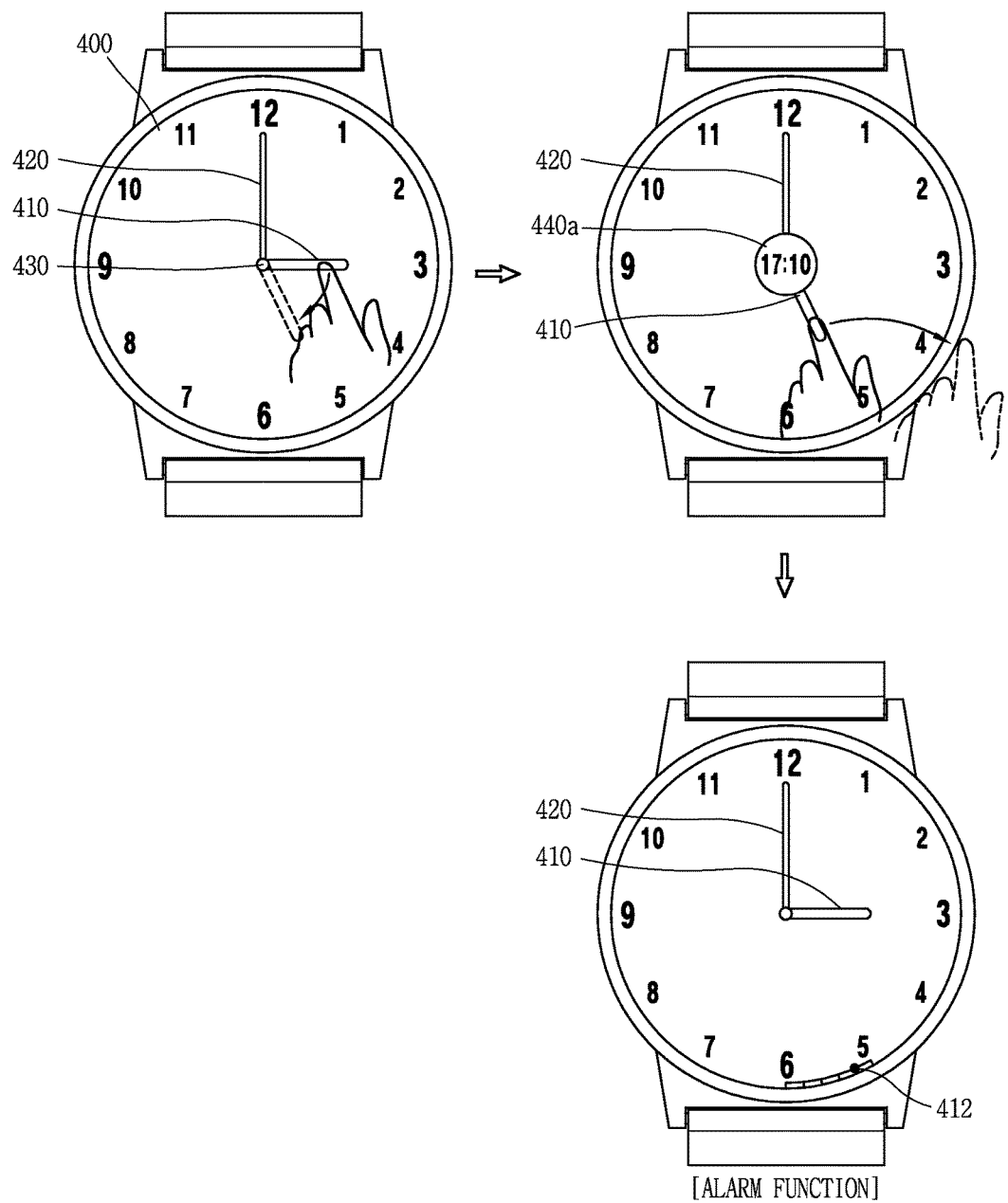
FIGS. 4A and 4B are conceptual views illustrating the control method illustrated in FIG. 3.

Referring to FIG. 4A, the touch screen 151 can output time-related screen information 400 (or time information). The time-related screen information 400 refers to screen information notifying a current time. The watch type mobile terminal disclosed herein performs various functions using the time-related screen information 400 output on the touch screen 151. Hereinafter, description will be given in more detail of a method of performing various functions using the time-related screen information 400 output on the touch screen 151, with reference to the accompanying drawings.

Figure 3:
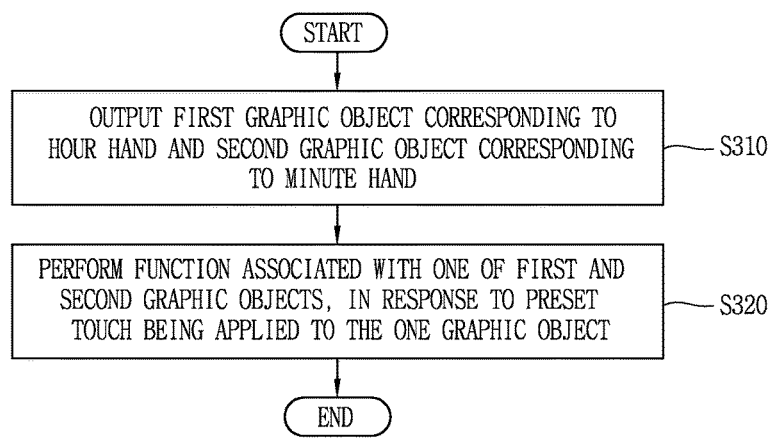
FIG. 3 is a flowchart illustrating a control method in accordance with the present invention.
Figure 4B:
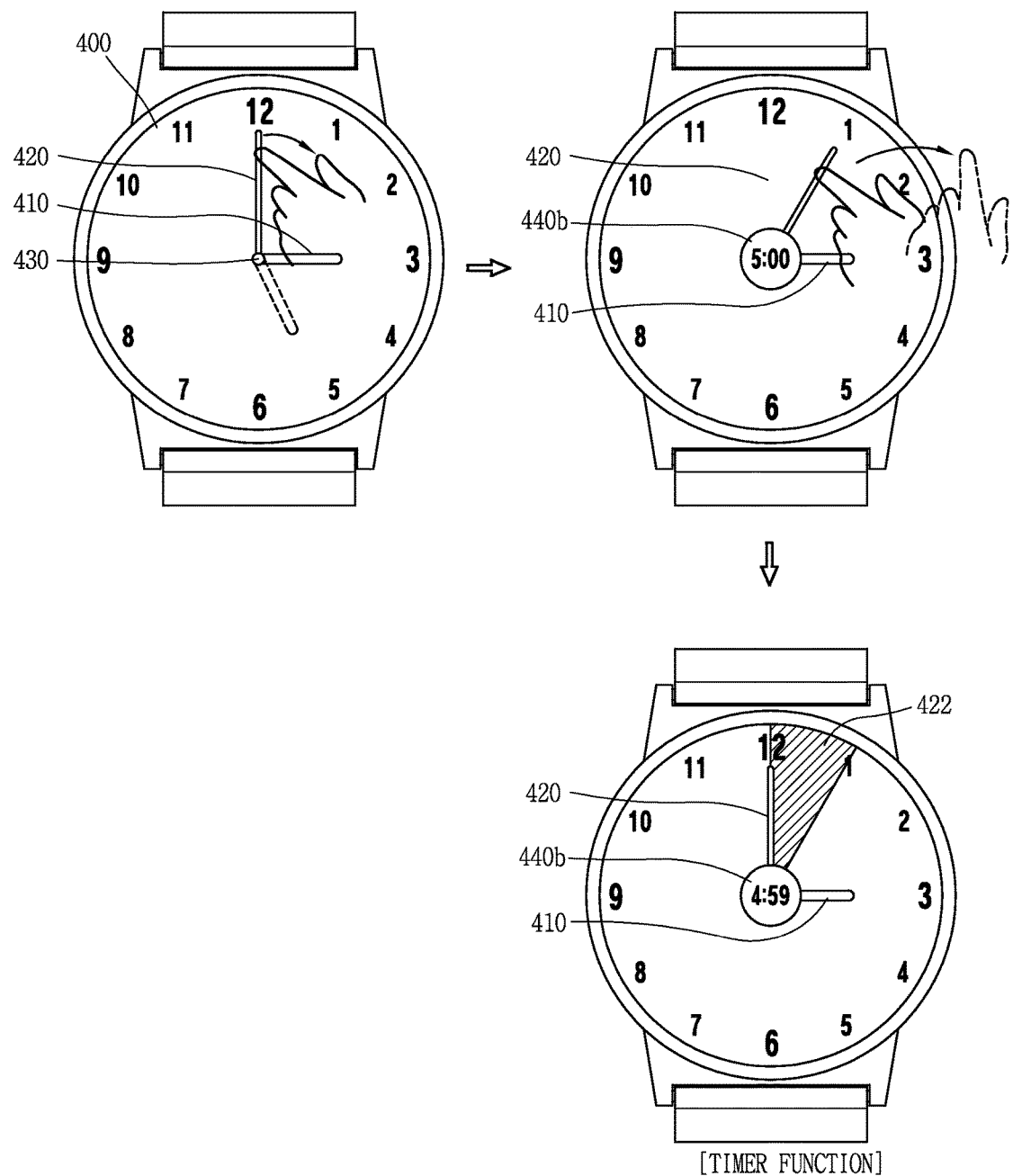

In particular, FIG. 3 is a flowchart illustrating a control method in accordance with the present invention, and FIGS. 4A and 4B are conceptual views illustrating the control method illustrated in FIG. 3. First, referring to FIG. 3, a method for controlling a watch type mobile terminal according to an embodiment of the present invention includes displaying a graphic object 410 (hereinafter, referred to as a first graphic object 410) corresponding to an hour hand, and a second graphic object 420 (hereinafter, referred to as a second graphic object 420) corresponding to a minute hand on the touch screen 151 (S310). In more detail, the time-related screen information 400 output on the touch screen 151 includes the first graphic object 410 corresponding to the hour hand and the second graphic object 420 corresponding to the minute hand.

The time-related screen information 400 can be output on the touch screen 151 in various forms. For example, as illustrated in FIG. 4A, the time-related screen information 400 output on the touch screen 151, as similar to a typical analog clock, includes a first graphic object corresponding to the hour hand, a second graphic object corresponding to the minute hand, numbers indicating time or hours (e.g., 1 to 12), and a control point 430 on which the first graphic object and the second graphic object intersect with each other (are connected with each other).

Further, the touch screen 151 may also output at least one of a graphic object corresponding to a second hand, date information, event notification information and world time information. Here, the event notification information can include information indicating a message reception, at least a part of a received message, information notifying a reception of an incoming call signal, and the like. The event notification information can be output by overlapping the time-related screen information 400.

The controller 180 (see FIG. 1A) can control the graphic object 410 corresponding to the hour hand to indicate a number corresponding to an hour according to a lapse of time, and control the second graphic object corresponding to the minute hand to indicate a number corresponding to a minute according to the lapse of time. The controller 180 can control the touch screen 151 to automatically change (or switch) a time indicated by the time-related screen information 400 according to the lapse of time. Accordingly, a user can check a current time, without a separate control command, by using the time-related screen information 400 output on the touch screen 151 of the watch type mobile terminal.

Also, the controller 180 can output the time-related screen information 400 on the touch screen 151 in various manners.

For example, the controller 180 can control the touch screen 151 to output the time-related screen information 400 in response to a turn-on of the mobile terminal.

As another example, the time-related screen information 400 can be output on the touch screen 151, in response to a preset touch (or a preset type of touch) (e.g., a short touch, a touch (or a long touch) which is applied and then maintained for a predetermined time or longer), a double touch, etc.) being applied in an inactive state of the touch screen 151 while the mobile terminal is turned on. The controller 180 can also switch at least part of the time-related screen information 400 into other screen information or the touch screen 151 from an active state into an inactive state, in response to a preset touch applied.

Afterwards, the control method performs a function associated with one of the first and second graphic objects, in response to a preset touch applied to the one of the first and second graphic objects (S320). The preset touch is a touch for performing a function associated with the first graphic object corresponding to the hour hand or a function associated with the second graphic object corresponding to the minute hand, and can include various types of touches. Examples of the preset touch include a short (or tap) touch, a long touch, a double touch, a multi touch, a drag touch, a flick touch, a pinch-in touch, a pinch-out touch, a swipe touch, a hovering touch and the like.

Hereinafter, the various types of touches will be described in more detail. The short (or tap) touch may be a touch that a touch object, namely, an object to apply a touch, (e.g., a finger or a stylus pen) is released within a predetermined time after coming in contact with the touch screen 151 (after a touch is applied). For example, the short (or tap) touch may be a touch that the touch object contacts the touch screen for a short time, like a single click of a mouse.

The long touch may be a touch that the touch object which has come in contact with the touch screen 151 is maintained in the contact state for a predetermined time or longer. For example, the long touch may be a touch that is applied onto the touch screen 151 by the touch object and then is maintained for more than a predetermined time. More concretely, the long touch may be a touch that is released after being continuously in a contact with on one point of the touch screen for more than a predetermined time. Also, the long touch may be understood as a touch corresponding to a touch and hold operation that the contact state of the touch object on the touch screen 151 is held for more than a predetermined time.

The double touch may be a touch that a short touch is consecutively applied onto the touch screen 151 at least two times within a predetermined time. The predetermined time which is described in the short touch, the long touch and the double touch may be decided by user setting. The multi-touch may be a touch that is applied onto at least two contact points of the touch screen 151 substantially at the same time point. The drag touch may a touch that a contact which has started from a first point of the touch screen 151 is continuously applied on the touch screen along one direction and then released on a second point different from the first point.

In more detail, the drag touch may be a touch that is applied to one point of the touch screen 151 by a touch object, continuously extends on the touch screen 151 and then is released at another point different from the one point. Also, the drag touch may also refer to a touch which continuously extends from a touch applied onto one point of the touch screen 151.

The flick touch may be a touch that the drag touch is applied within a predetermined time. In more detail, the flick touch may be a touch that a touch object which applies the drag touch is released from the touch screen 151 within a predetermined time. In other words, the flick touch may be understood as a drag touch that is applied at a preset speed or more.

The swipe touch may be a drag touch applied along a straight line. The pinch-in touch may be a touch that at least one of first and second touches applied to two different points (two points spaced from each other) on the touch screen 151 extend to be close to the other or each other. For example, the pinch-in touch may be a touch that is realized by an operation of narrowing a gap between fingers while the fingers contact two different points spaced apart from each other on the touch screen 151.

The pinch-out touch may be a touch that at least one of first and second touches applied to two different points (two points spaced from each other) on the touch screen 151 extend to be away from the other or each other. For example, the pinch-out touch may be a touch corresponding to an operation of spacing fingers farther away from each other while the fingers contact two different points spaced from each other on the touch screen 151.

The hovering touch may be touch corresponding to an operation of a touch object at a space apart from the touch screen 151 without touching the touch screen 151. As one example, the hovering touch may correspond to the proximity touch described in FIG. 1. For example, the hovering touch may be a touch corresponding to an operation that the touch object is held above one point, spaced from the touch screen 151, for a predetermined time or more.

This specification will illustrate an example in which a preset touch for performing functions associated with the first and second graphic objects is a drag touch which starts from one of the first and second graphic objects. However, the preset touch may also be implemented by applying the aforementioned various touches in the same or similar manner.

Different functions are associated with the first graphic object 410 corresponding to the hour hand and the second graphic object 420 corresponding to the minute hand, respectively. In more detail, the controller 180 can perform a different function, based on a type of a graphic object to which the preset touch is applied. The controller 180 can perform a first function when the preset touch is applied to the first graphic object 410 corresponding to the hour hand, while performing a second function, different from the first function, when the preset touch is applied to the second graphic object 410 corresponding to the minute hand.

Each of the first function and the second function may be one of functions related (relevant) to an alarm. The functions related to the alarm can include an alarm function (or an alarm setting function), a schedule function (or a schedule setting function), a timer function, a stopwatch function, and the like. Here, the alarm function refers to a function of controlling the mobile terminal to generate an alarm at a user-desired time. That is, when the first function related to the alarm is the alarm function, the second function related to the alarm may be another function (e.g., a timer function) which is different from the alarm function.

For example, when the preset touch is applied to the first graphic object 410 corresponding to the hour hand, the controller 180 can perform the first function (e.g., the alarm function) related to the alarm. Also, when the preset touch is applied to the second graphic object 420 corresponding to the minute hand, the controller 180 can perform the second function (e.g., the timer function) related to the alarm, which is different from the first function.

The preset touch, as aforementioned, may be a drag touch which starts from one of the first and second graphic objects 410 and 420. In more detail, the preset touch may be a touch that is applied to one of the first and second graphic objects 410 and 420 and then released after being moved in a contact state by a predetermined length.

When a drag touch starting from one of the first and second graphic objects 410 and 420 is applied, the controller 180 can control the touch screen 151 to change an output position of the one graphic object depending on the drag touch. Here, changing the output position of the one graphic object depending on the drag touch may refer to moving the one graphic object (or rotating the one graphic object centering on the control point 430) by the drag touch.

Also, when the drag touch is released, the controller 180 can output the one graphic object, which has changed in output position while the drag touch is applied, to indicate a current time. Here, outputting the one graphic object to indicate the current time may refer to restoring the output position of the one graphic object to a position at which the one graphic object has been located before the drag touch is applied.

When the drag touch extends from the one of the first and second graphic objects 410 and 420 and then is released at one point, the controller 180 can perform one of the first and second functions based on the one point. For example, when the first function associated with the first graphic object 410 corresponding to the hour hand is the alarm setting function, as illustrated in FIG. 4A, when the drag touch starting from the first graphic object 410 extends to be released at one point, the controller 180 can perform the alarm setting function based on the one point.

Specifically, when the drag touch is applied to the first graphic object 410 corresponding to the hour hand, the controller 180 can output on the touch screen 151 time information 440a corresponding to a point where the first graphic object moved by the drag touch is located. The time information 440a corresponding to the point where the first graphic object is located can be output on at least a part of an output region of the touch screen 151. For example, the time information 440a can be output on an output position of the control point 430 at which the first graphic object 410 corresponding to the hour hand and the second graphic object 420 corresponding to the minute hand intersect with each other.

Also, the time information 440a corresponding to the output position of the first graphic object 410 can be displayed while the drag touch is applied (or held) on the touch screen 151. In more detail, when the drag touch is applied to the first graphic object 410 on the touch screen 151, the time information 440a corresponding to a point at which the drag touch is located can be output while the drag touch is applied. When the first graphic object 410 corresponding to the hour hand is moved (or rotated) in response to the drag touch applied, the time information 440a which is time information corresponding to the moved (or rotated) point can change based on the changed position of the first graphic object 410. Here, the time information can change with an interval of a preset time unit (e.g., one-minute, five-minute, ten-minute, 30-minute, one-hour, etc.), and the preset time unit can be decided by a user setting.

As illustrated in first and second drawings of FIG. 4A, when the drag touch applied to the first graphic object 410 corresponding to the hour hand is released at a point corresponding to 17:10 (ten after five pm), the controller 180, as illustrated in a third drawing of FIG. 4A, can set the time of the point corresponding to 17:10 to an alarm time.

Also, the controller 180 can output notification information 412 at a position corresponding to the alarm time to notify the set alarm time. The notification information 412 can be output on the touch screen 151 until the alarm is generated as the current time arrives at the alarm time, or disappear after being output for a predetermined time from its output time point.

Also, referring to the third drawing of FIG. 4A, the first graphic object 410 which has been moved (or rotated) by the drag input returns to a point (a point indicating the current time), at which the first graphic object 410 has been located before the drag touch is applied, in response to the release of the drag touch.

As another example, when the function associated with the second graphic object 420 corresponding to the minute hand is the timer function, as illustrated in FIG. 4B, when the drag touch starting from the second graphic object 420 extends to be released at one point, the controller 180 can perform the timer function based on the one point. Referring to FIG. 4B, when the drag touch is applied to the second graphic object 420 corresponding to the minute hand, the controller 180 can perform the timer function of counting (or counting down) a time between an output position of the second graphic object 420 before the drag touch is applied and the one point at which the drag touch is released.

Referring to first and second drawings of FIG. 4B, when the drag touch is applied to the second graphic object 420, the controller 180 can output time information 440b, between an output point of the second graphic object 420 before the drag input is applied and one point where the drag input is located, on the touch screen 151 while the drag input is applied. For example, the touch screen 151 may output the time information 440b corresponding to 5 minutes when the time between the output position of the second graphic object 420 before the drag touch is applied and the moved (or rotated) point of the second graphic object by the drag input (i.e., the point where the drag input is located) is the 5 minutes.

The time information 440b can be output on at least a portion of an output region of the touch screen 151. As one example, the time information 440b can be output on an output position of the control point 430 at which the first graphic object 410 corresponding to the hour hand and the second graphic object 420 corresponding to the minute hand intersect with each other. When the drag input is applied to the second graphic object 420, the touch screen 151 may output thereon time information 440b, between the output point of the second graphic object 420 before the drag input is applied and the one point where the drag input is located (i.e., the point to which the second graphic object 420 has been moved (or rotated) by the drag touch), while the drag touch is applied.

When the second graphic object 420 corresponding to the minute hand is moved (or rotated) in response to the drag input applied thereto, the time information 440b corresponds to a time between a time at the output point of the second graphic objet 420 before being moved and a time at the moved point. The time information 440b can change based on the change of the position of the second graphic object 420. Here, the time information 440b can change with an interval of a preset time unit (e.g., one-second, five-second, ten-second, 30-second, one-minute, etc.), and the preset time unit may be decided by a user setting.

For example, as illustrated in the first and second drawings of FIG. 4B, when the drag touch which has been applied to the second graphic object 420 corresponding to the minute hand is released at a point where a time between the output point of the second graphic object 420 before the drag input is applied and the moved point of the second graphic object 420 by the drag input is 5 minutes, the controller 180, as illustrated in the third drawing of FIG. 4B, can execute the timer function of counting the time of 5 minutes.

Here, the counting can be started in response to the release of the drag touch. Here, the time information 440b output on the touch screen 151 can continuously be output even though the drag touch is released. Also, the time information 440b can change according to the lapse of time when the counting is started in response to the release of the drag input. That is, the touch screen 151 can output the time information 440b of counting the time set in the timer function.

Also, as illustrated in the third drawing of FIG. 4B, the second graphic object 420 which has been moved by the drag touch can be restored to a point at which it has been located before the drag input is applied (i.e., a point indicating a current time) based on the release of the drag input.

Also, the controller 180 can output notification information 422 to notify that the time function is ongoing. The notification information 422 may have various shapes. For example, as illustrated in the third drawing of FIG. 4B, the notification information 422 can correspond to changing a graphic effect (e.g., color) of a region of the time-related screen information 400, namely, a region between the output point of the second graphic object 420 and a timer expiration time. With the configuration of the present invention, a user can more easily and conveniently perform a desired function related to an alarm by controlling one of a graphic object corresponding to an hour hand and a graphic object corresponding to a minute hand.

Meanwhile, the present invention can further include a process of selecting one of the first graphic object corresponding to the hour hand and the second graphic object corresponding to the minute hand, in order to prevent an execution of an alarm-related function by a touch applied to a touch screen irrespective of the user's intent, or to receive a user's control command for setting the alarm-related function. Hereinafter, description will be given in more detail of a method of selecting one of the first graphic object corresponding to the hour hand and the second graphic object corresponding to the minute hand, with reference to the accompanying drawings.

FIGS. 5A to 5D are conceptual views illustrating a method of selecting one of a graphic object corresponding to an hour hand and a graphic object corresponding to a minute hand. The mobile terminal according to an embodiment of the present invention can select one of the first and second graphic objects 410 and 420 in response to various types of touches applied to the touch screen 151.

In more detail, before the preset touch (e.g., the drag touch) illustrated in FIGS. 3 to 48 is applied to one of the first and second graphic objects, the controller 180 can select one graphic object, to which the preset touch is to be applied, based on at least one of a touch being applied to one of the first and second graphic objects and maintained for a predetermined time or more (e.g., a long touch being applied), a touch being applied to an intersecting point of the first and second graphic objects and extending to one of the first and second graphic objects, and a touch being applied a preset area on one of the first and second graphic objects.

Afterwards, the preset touch can extend continuously from the at least one touch (the long touch, the touch extending after being applied to the intersecting point, and the touch applied to the preset area). That is, the controller 180 can perform a function related to an alarm in response to the preset touch being applied while the at least one touch applied on the touch screen 151 is maintained (without being released). However, the controller 180 can also perform the alarm-related function in response to the preset touch being applied within a reference time after the at least one touch is applied and then released.

The at least one touch will be described in more detail. The controller 180 can select one of the first and second graphic objects, in response to at least one touch being applied to the one graphic object and maintained for a predetermined time or more (e.g., a long touch applied). When the touch applied to the one of the first and second graphic objects is maintained for the predetermined time or more (e.g., when the long touch is applied), the controller 180 can change an output method of at least part of the time-related screen information displayed on the touch screen 151, to notify the selection of the one graphic object.

Figure 5A:
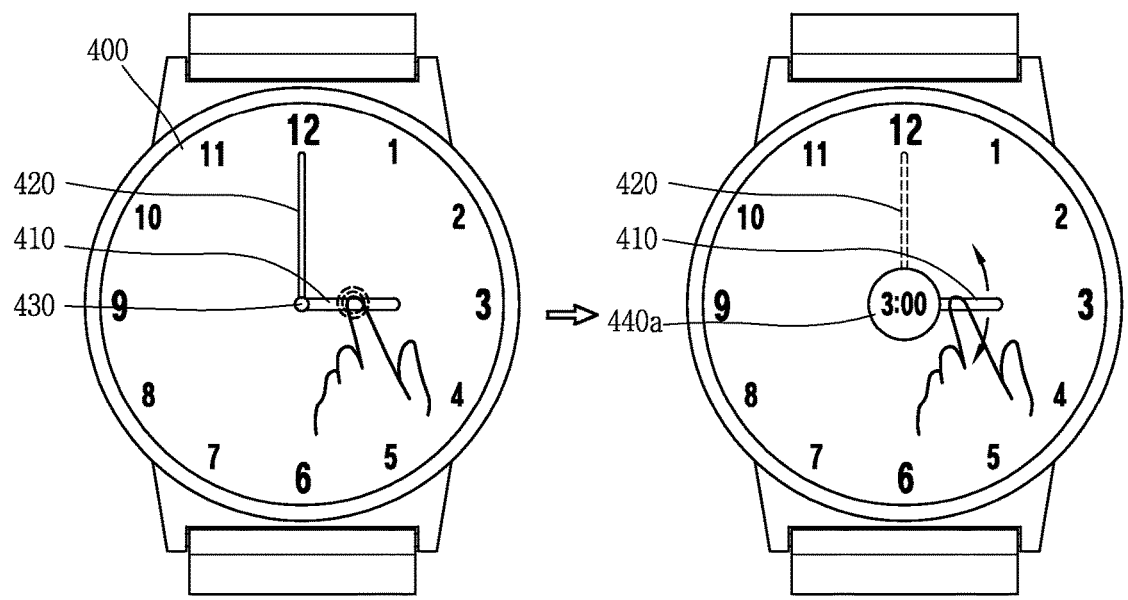
FIGS. 5A to 5D are conceptual views illustrating a method of selecting one of a graphic object corresponding to an hour hand and a graphic object corresponding to a minute hand.

For example, as illustrated in FIG. 5A, when a long touch is applied to the first graphic object 410, the controller 180 can select the first graphic object 410. Also, the controller can change an output method of the first graphic object 410 or an output method of at least part of screen information, except for the first graphic object 410, of the time-related screen information 400, in response to a touch being applied to the first graphic object 410 and maintained for a predetermined time or more (e.g., a long touch being applied).

For example, the controller 180 can change a color, increase a size or change an output shape of the first graphic object 410 in response to a long touch being applied to the first graphic object 410. Also, the controller 180 can reduce sharpness of the second graphic object 420 to which a touch has not been applied, or output time information 440a on the intersecting point (control point) 430, in response to a long touch being applied to the first graphic object 410.

Afterwards, the controller 180 can perform a first function related to an alarm (e.g., alarm function), which is associated with the first graphic object 410, when a preset touch (e.g., a drag touch) is applied continuously after a touch is applied to the first graphic object 410 and maintained for a predetermined time or more. The controller 180 can also select one of the first and second graphic objects, in response to a touch being applied to the intersecting point (control point) 430 of the first and second graphic objects and then extending to the one of the first and second graphic objects.

Figure 5B:
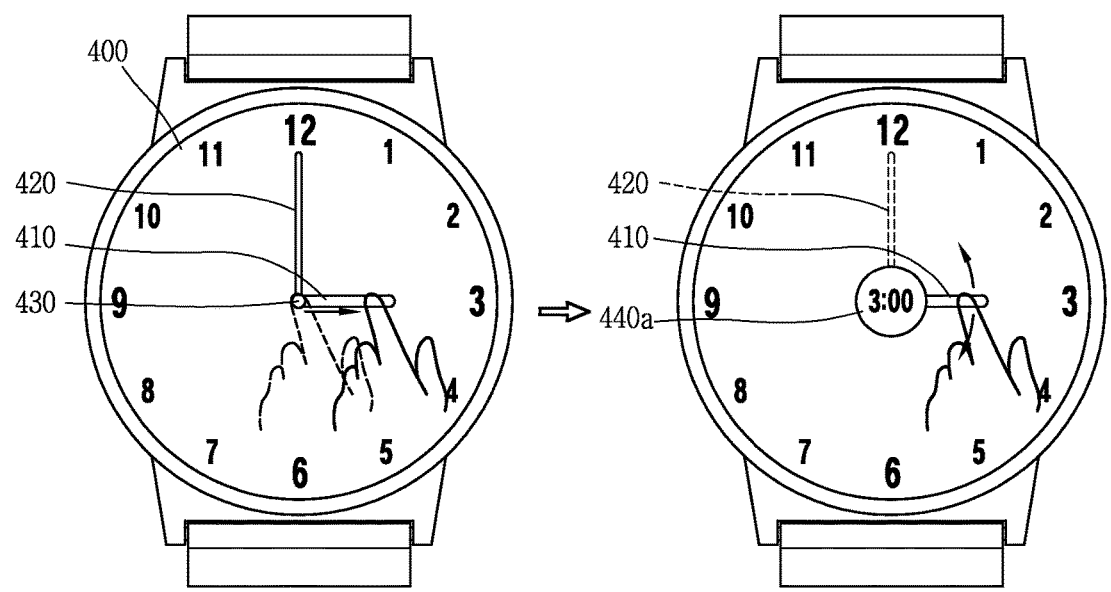

For example, as illustrated in FIG. 5B, the controller 180 can select the first graphic object 410 when a drag touch is applied to the intersecting point 430 and then extends toward the first graphic object 410. When the one of the first and second graphic objects is selected, the controller 180 can change an output method of at least part of the time-related screen information output on the touch screen 151 to notify that the one graphic object has been selected (which has been described with reference to FIG. 5A, so detailed description thereof is omitted).

Figure 5C:
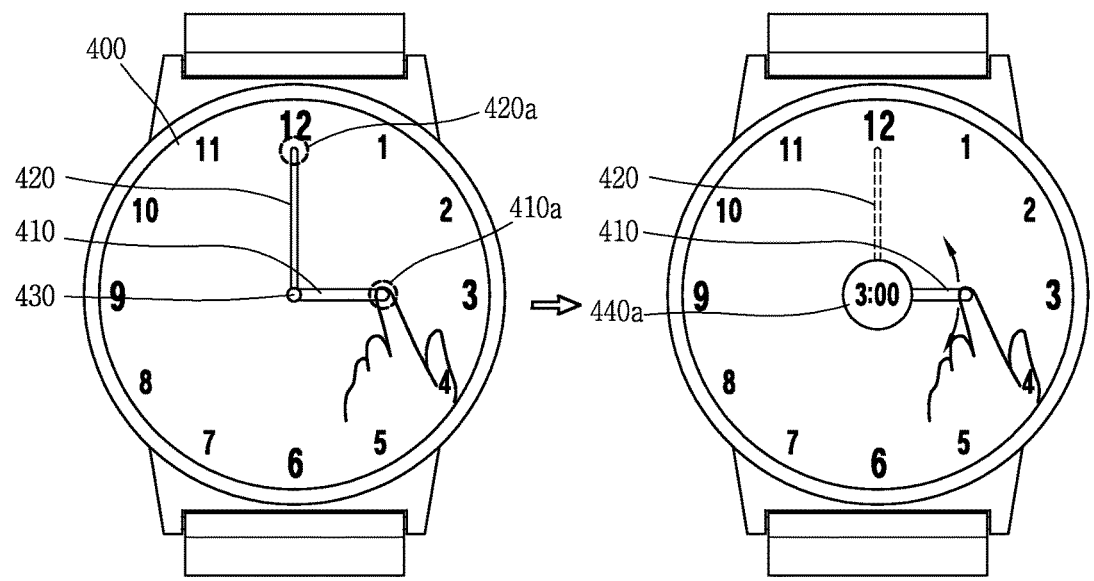

The controller 180 can also select one of the first and second graphic objects, in response to a touch being applied to a preset area on the one of the first and second graphic objects. As shown in FIG. 5C, the preset area can be an end portion 410a, which is opposite to the intersecting point (control point) 430, of the first graphic object 410 corresponding to the hour hand, or an end portion 420a, which is opposite to the intersecting point (control point) 430, of the second graphic object 420 corresponding to the minute hand.

For example, as illustrated in FIG. 5C, when a touch is applied to the end portion 410a, opposite to the intersecting point, of the first graphic object 410, the controller 180 can select the first graphic object 410. When one of the first and second graphic objects is selected, the controller 180 can change an output method of at least part of time-related screen information output on the touch screen 151, to notify that the one graphic object has been selected (the related details will be understood by the description illustrated in FIG. 5A). Methods of selecting the first graphic object are also equally/similarly applied to a method of selecting the second graphic object.

Figure 5D:
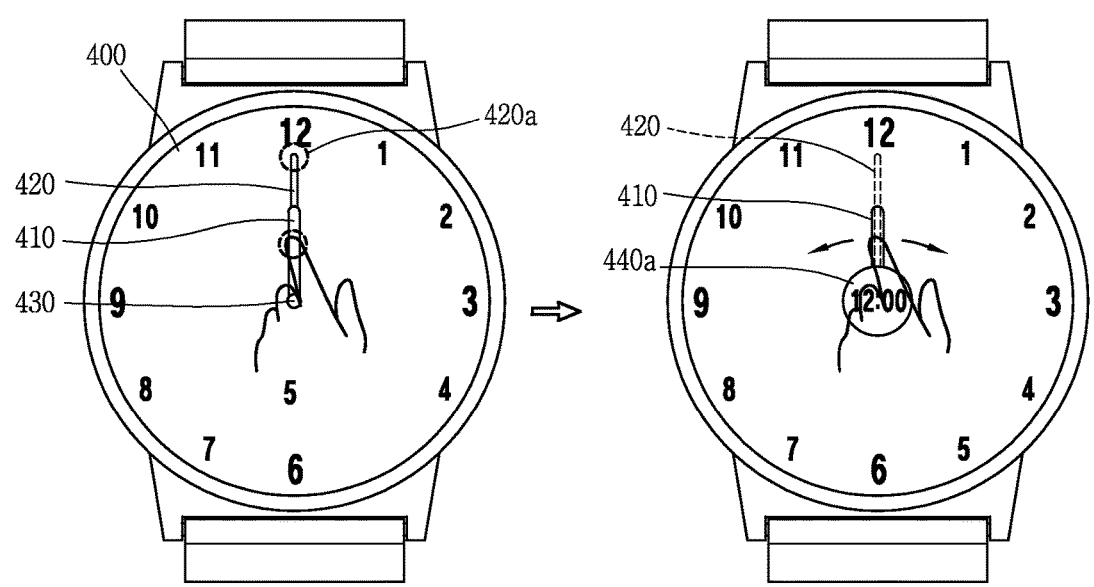

Meanwhile, as illustrated in FIG. 5D, at least part of the first graphic object 410 corresponding to the hour hand and at least part of the second graphic object 420 corresponding to the minute hand can overlap each other or be located adjacent to each other. That is, there may be a difficulty in selecting one of the first and second graphic objects due to an area of a finger applying a touch. In this instance, the controller 180 can select one of the first and second graphic objects 410 and 420 in various manners.

Specifically, the controller 180 can select one of the first and second graphic objects 410 and 420, in response to a preset touch (e.g., a touch being applied and maintained for a predetermined time or more (long touch)) applied to one of the first graphic object 410, the second graphic object 420 and the control point 430. For example, as illustrated in FIG. 5D, when the preset touch is applied to an overlapping portion of the first graphic object 410 and the second graphic object 420 (or to both of the first and second graphic objects 410 and 420), the controller 180 can select the first graphic object 410. Also, when the preset touch is applied to the control point 430, the controller 180 can select the first graphic object.

As another example, the controller 180 can select the second graphic object 420, in response to the preset touch (e.g., the long touch) being applied to the second graphic object 420, a touch being applied to a preset area of the second graphic object 420 (e.g., the end portion 420a of the second graphic object 420, opposite to the control point 430), or a touch extending toward the second graphic object 420, starting from the overlapping portion (or the control point 430) of the first and second graphic objects 410 and 420.

As illustrated in FIGS. 5A to 5D, when a preset touch (e.g., the drag touch illustrated in FIGS. 3 to 4D) is applied continuously after selection of one of the first and second graphic objects 410 and 420 output on the touch screen 151, the controller 180 can perform a function related to an alarm associated with the one graphic object. The controller 180 can also perform the function related to the alarm associated with one of the first and second graphic objects, in response to a preset touch (e.g., a drag touch) being applied to the one graphic object.

With the configuration according to an embodiment of the present invention, a user's intent to perform an alarm-related function can be reflected, and an operation due to an unexpected touch can be prevented from being performed. Also, the present invention can provide UX/UI for the user to more correctly select a desired function, among functions relevant to an alarm.

Hereinafter, description will be given in more detail of a method of performing an alarm-related function using one of a first graphic object corresponding to an hour hand and a second graphic object corresponding to a minute hand, with reference to the accompanying drawings. First, referring to FIGS. 6A to 10, a method of controlling a first function relevant to an alarm using a first graphic object corresponding to the hour hand will be described.

Hereinafter, description will be given of an example in which the first function relevant to the alarm is a notification function or a schedule function. From the perspective that the schedule function is a function of generating an alarm at a preset time, the schedule function may be understood as a concept including the alarm function.

Also, in an embodiment of the present invention, the alarm-related function can be performed, in response to a preset touch being applied continuously after at least one touch illustrated in FIGS. 5A to 5D is applied (or within a reference time after the at least one touch is applied). Or, the alarm-relevant function can be performed in response to a preset touch being directly applied without the at least one touch. This may be decided by a user setting.

FIGS. 6A to 6D are conceptual views illustrating a method of performing a first function associated with an alarm by using a graphic object corresponding to the hour hand. As illustrated in a first drawing of FIG. 6A, when a preset touch (hereinafter, description will be given based on a drag touch) starting from the first graphic object 410 corresponding to the hour hand is applied, the controller 180, as illustrated in a second drawing of FIG. 6A, can change an output position of the first graphic object 410 in response to the drag touch. Also, as illustrated in the second drawing of FIG. 6A, while the drag touch is maintained, the controller 180 can output time information 600a corresponding to a point at which the drag touch is located, namely, an output point of the first graphic object 410. For example, the time information 600a can be output on the control point 430 at which the first and second graphic objects 410 and 420 intersect with each other.

Meanwhile, time-related screen information output on the touch screen 151 is present only on 12-hour units, and thus a method of selecting the morning (am) and the afternoon (pm) is needed. Thus, as illustrated in the second drawing of FIG. 6A, when the drag touch is turned by 360-degree, the controller 180 can output visual information 600b which is a time after 12 hours. This allows the user to select the morning (Am) or the afternoon (Pm).

Figure 6A:
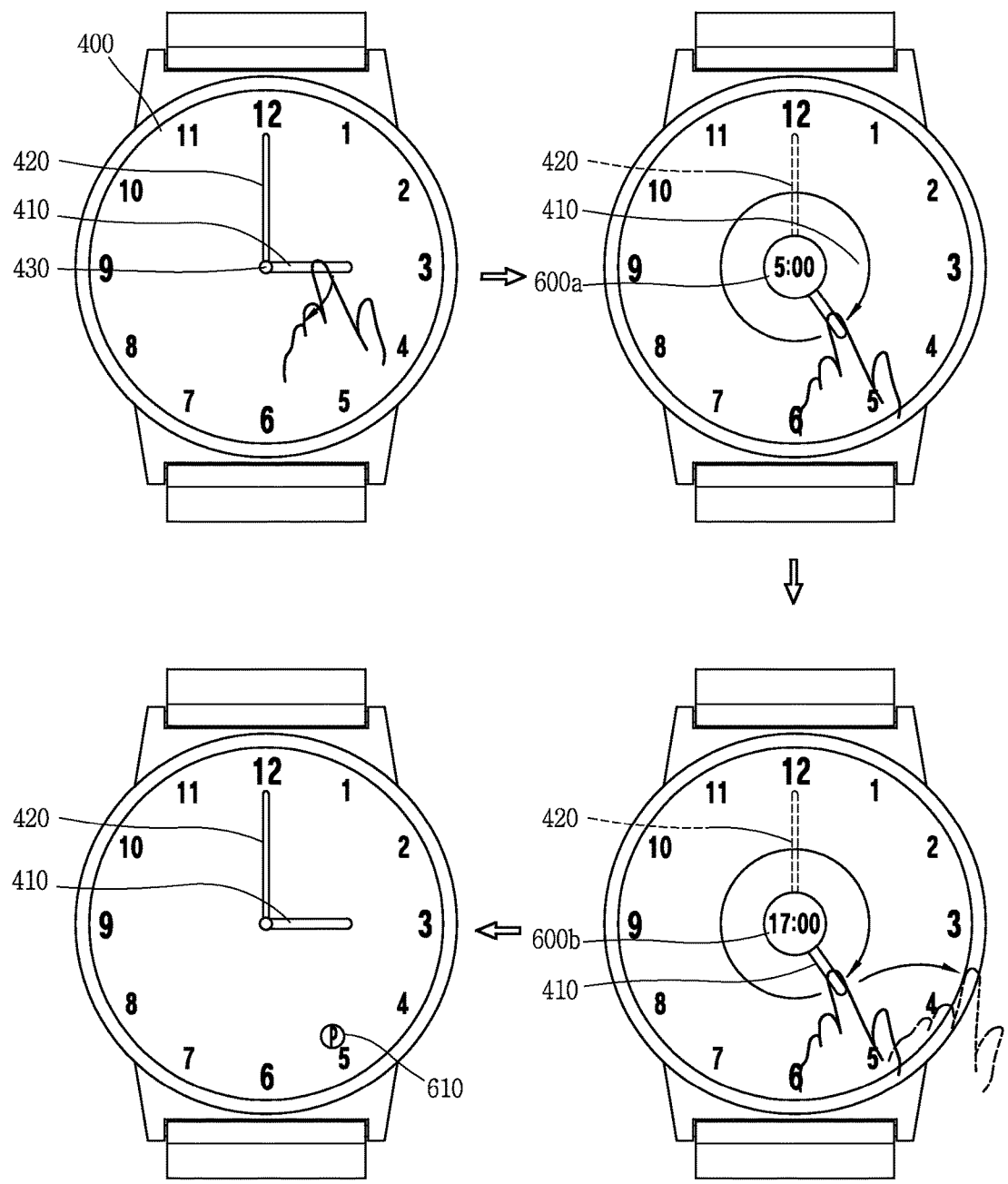
FIGS. 6A to 6D are conceptual views illustrating a method of performing a first function associated with an alarm by using a graphic object corresponding to an hour hand.

Afterwards, as illustrated in a third drawing of FIG. 6A, when the drag touch is released at one point, the controller 180 can set an alarm based on time corresponding to the one point. For example, when the drag touch is released while the first graphic object 410 is located at a point corresponding to a time of 17:00, the controller 180 can set the time of 17:00 to the alarm time.

When the drag touch is released, as illustrated in a fourth drawing of FIG. 6A, notification information 610 can be output on the touch screen 151, specifically, on a point corresponding to the alarm time, to notify that the alarm has been set. The notification information 610 can be implemented into various forms or shapes. For example, the notification information 610 can be output in a shape of an icon indicating the morning A or the afternoon P. The first graphic object 410 of which output position has changed by the drag touch can also be moved to a position indicating a current time.

Meanwhile, an embodiment of the present invention can provide a UX/UI for a user to set an alarm in detail when setting the alarm using the first graphic object. As illustrated in a first drawing of FIG. 6B, after a drag touch starting from the first graphic object 410 is applied up to one point, when the drag touch is maintained at the one point for a predetermined time or more, as illustrated in the second drawing of FIG. 6B, (when a touch applied to the first graphic object extends to one point and then is maintained at the one point for a predetermined time or more, or when a drag touch is applied up to one point and maintained at the one point for a predetermined time or more), the controller 180, as illustrated in a third drawing of FIG. 6B, can change at least part of the time-related screen information 400 into screen information 620*a* for setting details.

Figure 6B:
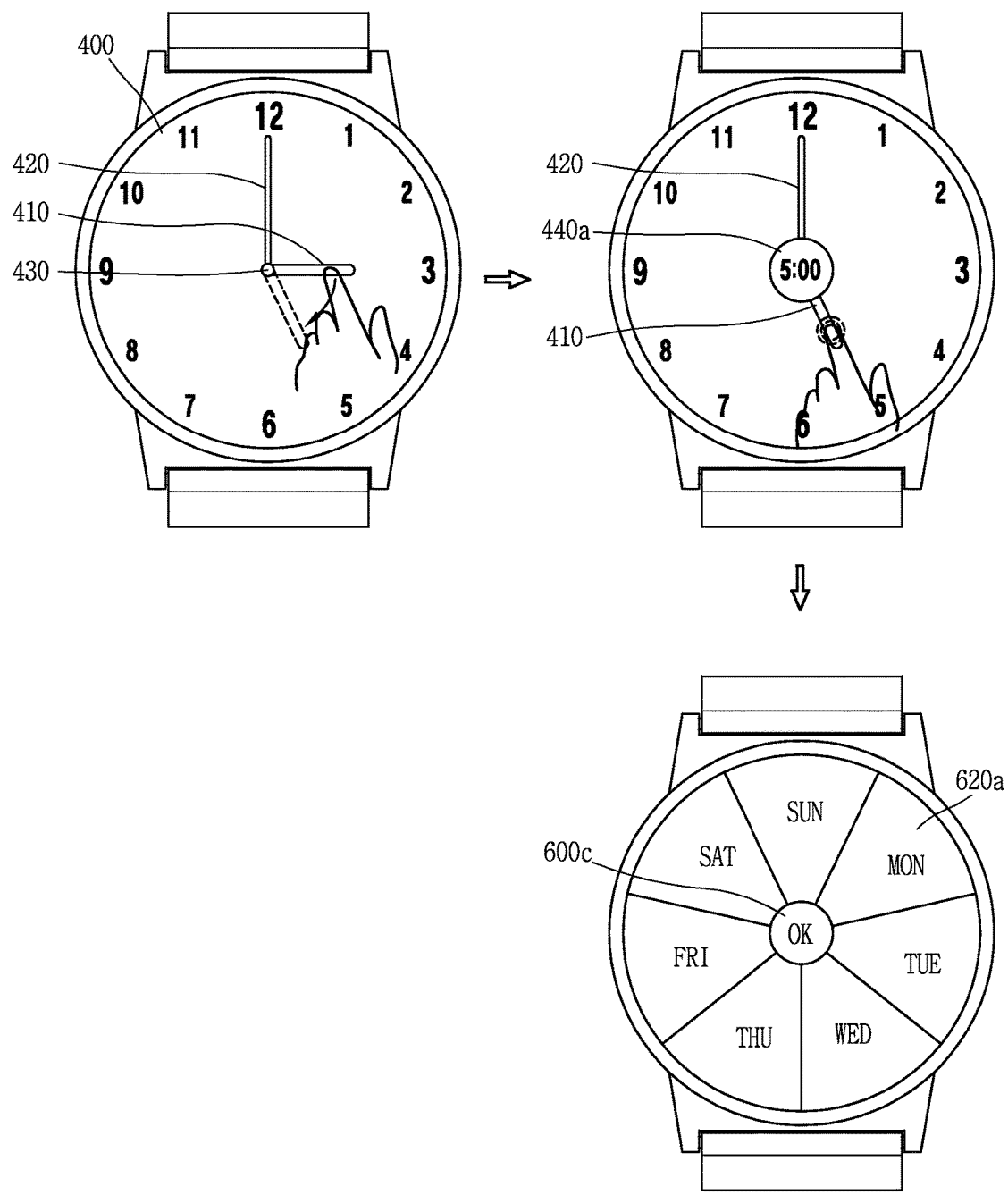

The screen information 620*a* for setting details, as illustrated in FIG. 6B, can include day-related information. When at least one day is selected from the day-related information and then an OK button 600*c* is selected, the controller 180 can set an alarm based on the time information corresponding to the one point at which the drag touch is maintained and information related to the selected day.

Meanwhile, the screen information for setting the details may be implemented into various shapes. For example, as illustrated in first and second drawings of FIG. 6C, the screen information 620*b* for setting the details can include at least one of screen information 632*a* for setting an alarm and screen information 632*b* for setting a schedule. As one example, the touch screen 151 can output thereon a tab 630*a* corresponding to the screen information 632*a* for setting the alarm, and a tab 630*b* corresponding to the screen information 632*b* for setting the schedule. When one of the tabs 630*a* and 630*b* is selected, screen information corresponding to the selected tab can responsively be output.

However, while one of the screen information 632*a* for setting the alarm and the screen information 632*b* for setting the schedule is output on the touch screen 151, and when a preset touch (e.g., a drag touch applied in a left/right direction) is applied, the controller 180 can change the one to the other in response to the preset touch.

Figure 6C:
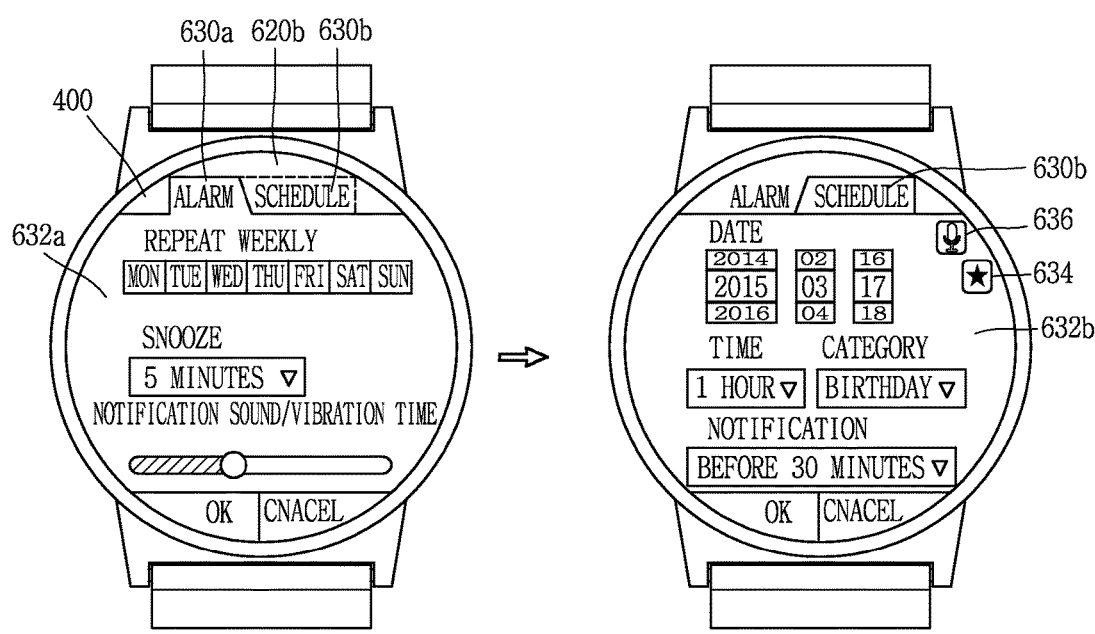

Referring to the first drawing of FIG. 6C, the screen information 632*a* for setting the alarm can include day-related information for selecting a day to generate an alarm, a repeat interval (snooze time) information for setting a snooze time, a menu for adjusting strength of notification sound/vibration, and the like. Referring to the second drawing of FIG. 6C, the screen information 632*b* for setting the schedule can include date-related information for selecting a date, schedule time information for selecting a schedule-progressing time, type information for selecting a type (category) of a schedule, notification time setting information for setting a time to generate a notification based on a schedule time, an icon 636 associated with a voice recording function, an icon 634 for setting whether or not a schedule is important, and the like.

Here, the schedule time refers to a time that the schedule is started. As illustrated in the second drawing of FIG. 6B, the schedule time can be a time corresponding to one point at which a drag touch is maintained for a reference time or more. When a touch is applied to the icon 636 associated with the voice recording function, the controller 180 can activate the microphone 122 (see FIG. 1A), and store (save) voice information input from the exterior. The stored voice information can be output when a current time arrives at an alarm-output time. The screen information for setting the details are not limited to the structures illustrated in FIGS. 6B and 6C, but may be implemented into various forms by combinations of structures illustrated in FIGS. 6B and 6C.

Meanwhile, the mobile terminal according to an embodiment of the present invention can simultaneously store a voice memo during a process of setting an alarm using the first graphic object 410. For example, the controller 180 can activate the microphone, in response to that a touch (e.g., a long touch) for selecting the first graphic object 410 is applied as illustrated in a first drawing of FIG. 6D, or in response to a preset touch (e.g., a drag touch) being applied to the first graphic object 410 as illustrated in a second drawing of FIG. 6D.

The activation of the microphone may be maintained while the preset touch is maintained. That is, the microphone can change from the activated state into a deactivated state, in response to a release of the preset touch (e.g., a drag touch) applied to the first graphic object 410. When the drag touch is applied to the first graphic object 410 as illustrated in a third drawing of FIG. 6D, the controller 180 can activate the microphone and receive voice information 650 input from the outside.

Figure 6D:
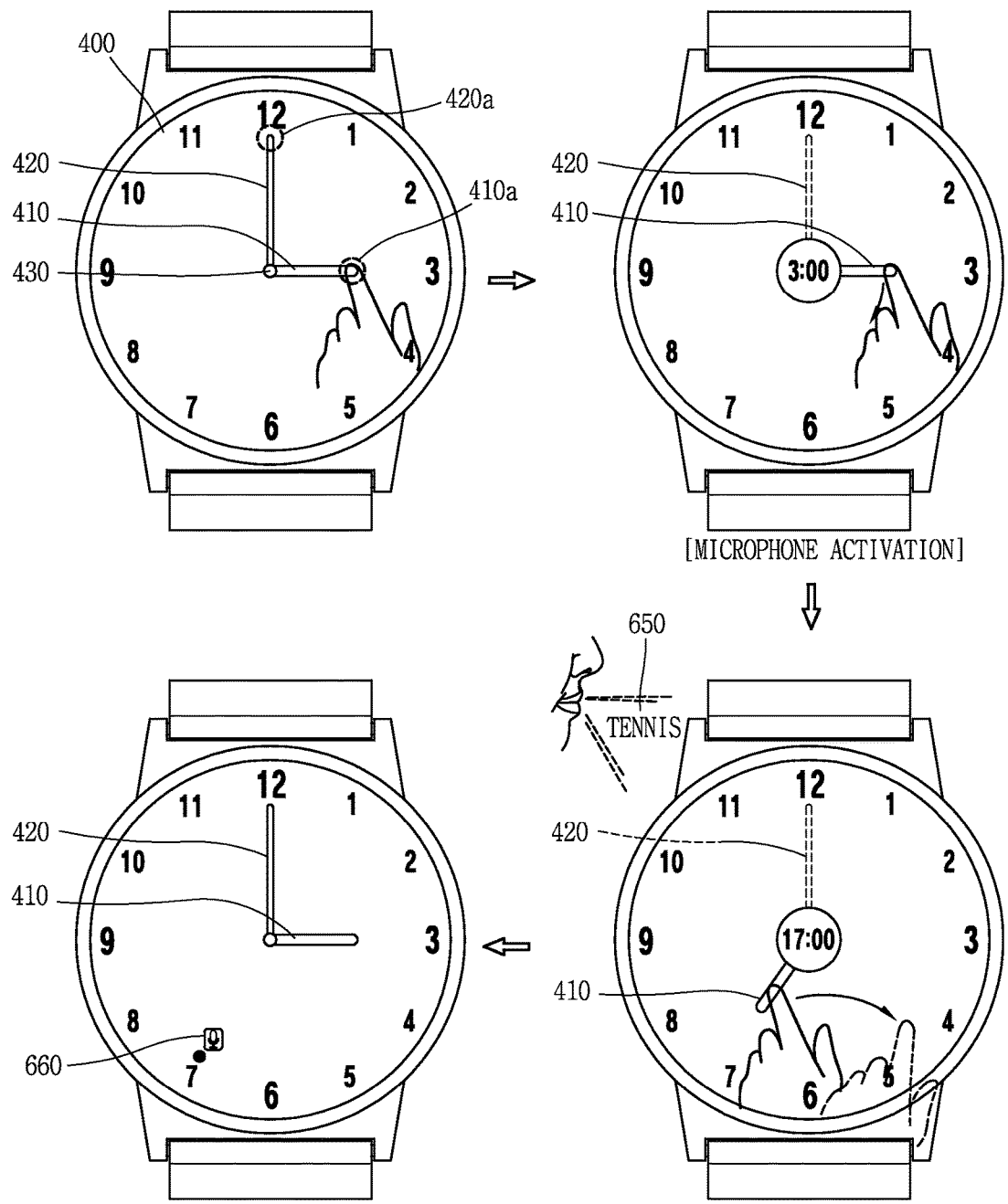

Afterwards, when the drag touch applied to the first graphic object 410 is released, the controller 180, as illustrated in a fourth drawing of FIG. 6D, may set an alarm (or a schedule) based on time information corresponding to a released point of the drag touch and the voice information 650. When the voice information 650 is received, the touch screen 151 may output thereon an icon 660, which notifies that the voice information 650 has been stored, at or near a point corresponding to the time information.

When the alarm is set in association with the voice information 650, the controller 180 can output the voice information 650 when the current time arrives at the set alarm time. This configuration according to an embodiment of the present invention allows for setting an alarm (or a schedule) more intuitively and conveniently using a first graphic object corresponding to an hour hand, resulting in enhancement of user convenience.

Hereinafter, a method of controlling the touch screen 141 when an alarm is preset will be described in more detail with reference to the accompanying drawings. FIGS. 7A, 7B, 8A and 8B are conceptual views illustrating a method of controlling at least one of a graphic object corresponding to an hour hand and a graphic object corresponding to a minute hand based on a preset alarm.

The mobile terminal according to an embodiment of the present invention can set an alarm in various manners. For example, the controller 180 can set an alarm according to the methods illustrated in FIGS. 6A to 6D, or when an alarm is set in another terminal interoperable with the mobile terminal.

Figure 7A:
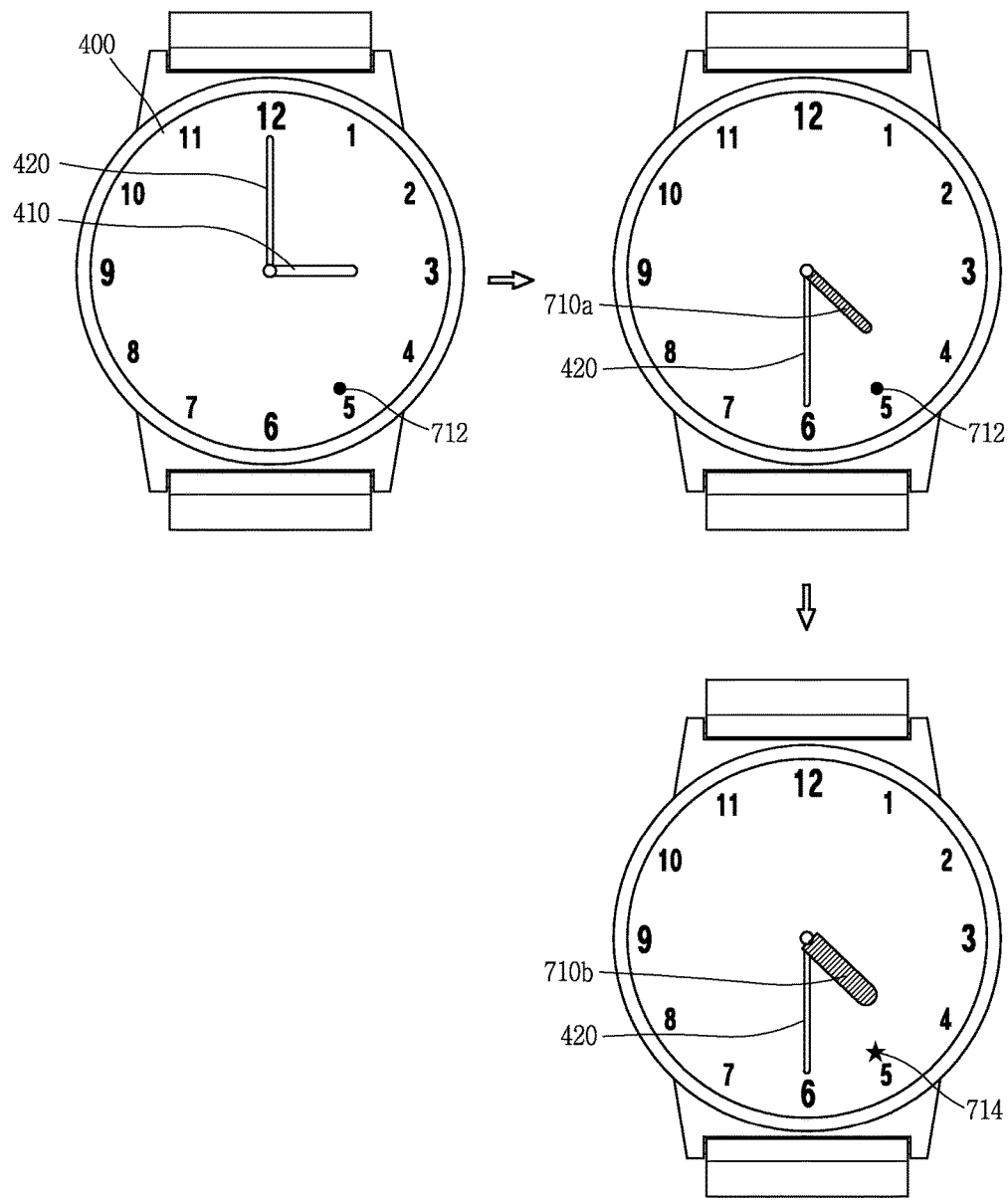
FIGS. 7A, 7B, 8A and 8B are conceptual views illustrating a method of controlling at least one of a graphic object corresponding to an hour hand and a graphic object corresponding to a minute hand based on a preset alarm.

When an alarm is preset, as illustrated in a first drawing of FIG. 7A, a touch screen 151 can output thereon notification information 712 indicating that the alarm has been set at a position corresponding to an alarm time of the preset alarm. However, the notification information 712 can always be output or cannot be output. The notification information 712 which has not been output can be output in response to a preset touch (e.g., a short touch, a double touch, etc.) applied to the touch screen 151. Or, the notification information 712 which has been output can disappear in response to the preset touch applied to the touch screen 151.

When the alarm is preset, the controller 180 can change an output method of at least one of the first and second graphic objects 410 and 420, based on an arrival of a current time at a time before a preset time from the alarm time corresponding to the preset alarm. For example, as illustrated in a second drawing of FIG. 7A, when the alarm time of the preset alarm is 5 o'clock (e.g., 5:00) and the preset time is 30 minutes, the controller 180 can change the output method of the at least one of the first and second graphic objects 410 and 420, when a current time arrives at a time (4:30) before the preset time (30 minutes) from the alarm time (5:00). The preset time can be decided by a user setting.

The controller 180 can change the output method of the at least one of the first and second graphic objects 410 and 420 to facilitate the user to recognize (or receive) notification as the current time comes closer to the alarm time corresponding to the alarm. Here, the change in the output method can include changing a color, a shape, a thickness and the like of at least one of the first and second graphic objects 410 and 420.

Also, the controller 180 can output at least one of the first and second graphic objects 410 and 420 in different output methods according to a type of the preset alarm. For example, as illustrated in the second drawing of FIG. 7A, when the preset alarm is a first type (e.g., a normal alarm) 712, the controller 180 can change the first graphic object 410 according to a first output method 710*a* (e.g., changing a color).

As another example, as illustrated in a third drawing of FIG. 7A, when the preset alarm is a second type (e.g., an important alarm) 714, the controller 180 can change the first graphic object 410 according to a second output method 710*b* (e.g., increasing a thickness with changing a color), different from the first output method 710*a*. Meanwhile, while the notification information 412 notifying the preset alarm is not output, when the output method of the first graphic object 410 is changed as the current time arrives at the time before the preset time from the alarm time corresponding to the preset alarm, the controller 180 can output the notification information 712 notifying the preset alarm at a position corresponding to the alarm time of the preset alarm.

Figure 7B:
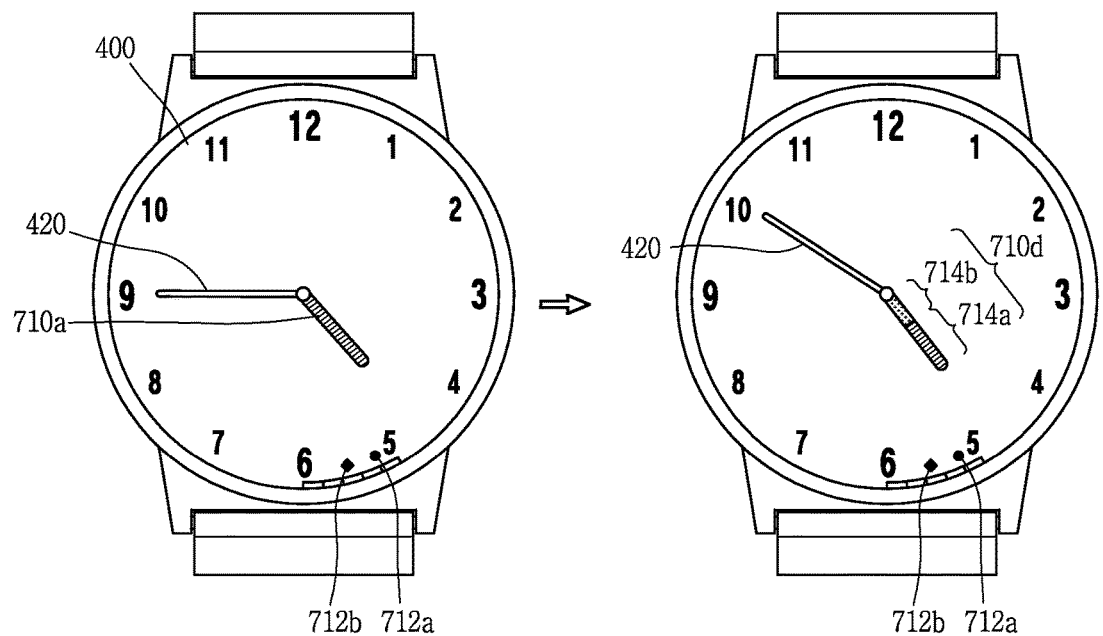

Hereinafter, description will be given of a when a plurality of alarms are set. The mobile terminal according to an embodiment of the present invention, as illustrated in FIG. 7B, can have a plurality of alarms set therein. Here, description will be given of an example in which a first alarm 712*a* is set to 5:10, and a second alarm 712*b* is set to 5:20.

Meanwhile, when the change in the output method corresponds to a change in a color of at least one of the first and second graphic objects 410 and 420, when a current time is past a time before a preset time from each alarm time of the plurality of alarms, the controller 180 can output a plurality of colors, which are visually distinctive, on the at least one of the first and second graphic objects 410 and 420, as many as a number of the preset alarms.

For example, assuming that the preset time is 30 minutes, as illustrated in a first drawing of FIG. 7B, when a current time (4:45) is past a time (4:40) before the preset time (30 minutes) from the alarm time (5:10) corresponding to the first alarm 712*a*, the controller 180 can change a color 710*a* of the first graphic object 410. Afterwards, as illustrated in a second drawing of FIG. 7B, when a current time (4:50) is past a time (4:50) before the preset time (30 minutes) from the alarm time (5:20) corresponding to the second alarm 712*b*, the controller 180 can output a plurality of colors 714*a* and 714*b*, which are visually distinctive and correspond to the number (two) of the plurality of preset alarms, on at least one of the first and second graphic objects 410 and 420 (710*d*).

Here, sizes of output areas of the plurality of colors 714*a* and 714*b* can be decided based on the plurality of alarm time. For example, when the alarm time corresponding to the first alarm is 5:10 and the alarm time corresponding to the second alarm is 5:20, a size of an output area of a first color corresponding to the first alarm 712*a* can be greater than a size of an output area of a second color corresponding to the second alarm 712*b*, of the plurality of colors. That is, when the current time is past a time before a preset time from an alarm time corresponding to each of the plurality of alarms, the controller 180 can output an area of the color 714*a* associated with the alarm time 712*a*, which is closer to the current time of each alarm time corresponding to the plurality of alarms, to be greater than an area of the color 714*b* associated with the other alarm time 712*b*.

The foregoing description has been given of the example of changing the output method of the first graphic object 410 for brief explanation, but the present invention is not limited to this. The present invention can also change an output method of at least one of the first graphic object 410 and the second graphic object 420 in response to that a current time arrives at a time before a preset time from an alarm time corresponding to a preset alarm.

With the configuration, the present invention can provide notification to a user in advance by changing an output method of at least one of first and second graphic objects before a preset time earlier than an alarm time corresponding to a preset alarm when the preset alarm (schedule) is present.

Figure 8A:
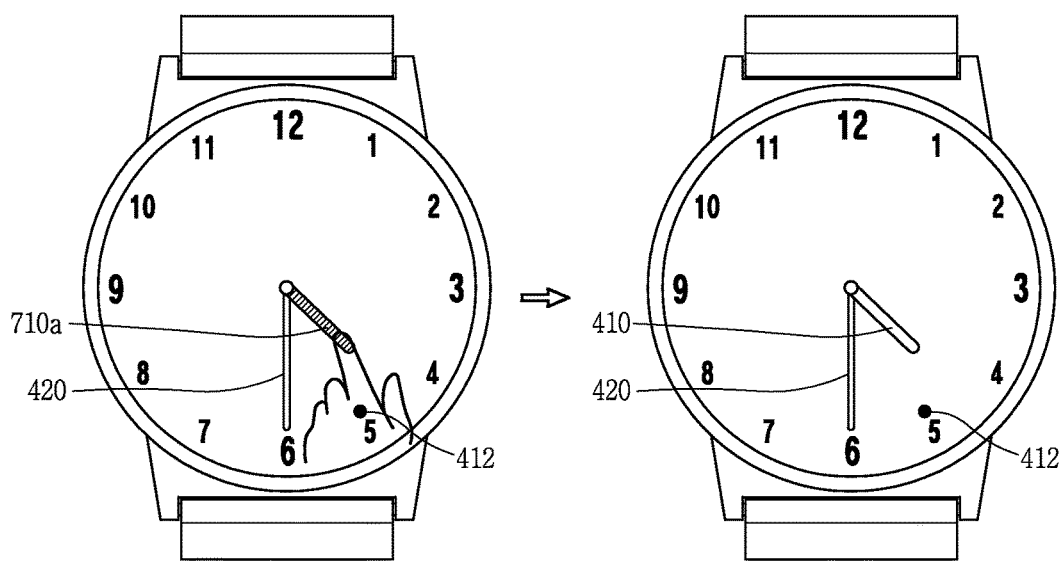

Hereinafter, a method of controlling a graphic object of which output method has changed will be described in more detail with reference to the accompanying drawings. Referring to FIG. 8A, an output method of the first graphic object 410 displayed on the touch screen 151 can change in response to that a current time arrives at a time before a preset time from an alarm time corresponding to a preset alarm 412. The controller 180 can perform various functions in response to a preset touch applied to the first graphic object 710*a* whose output method has changed.

For example, as illustrated in a first drawing of FIG. 8A, when a touch is applied to the first graphic object 710*a* with the changed output method, the controller 180, as illustrated in a second drawing of FIG. 8A, can restore the first graphic object 710*a* with the changed output method into the original first graphic object 410 (i.e., the first graphic object before its output method has changed).

Figure 8B:
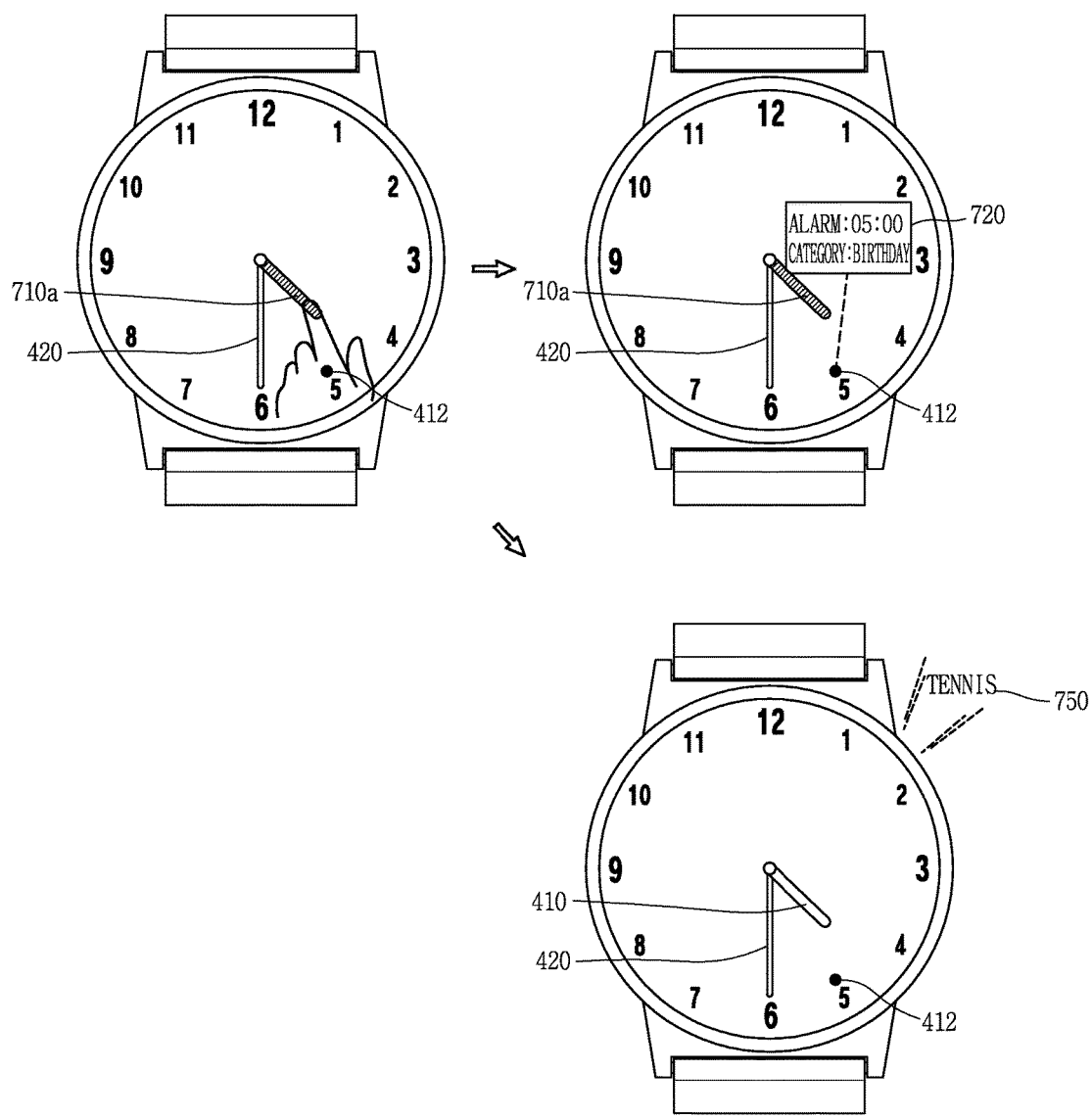

As another example, as illustrated in a first drawing of FIG. 5B, when a touch is applied to the first graphic object 710*a* with the changed output method and maintained for a predetermined time or more (e.g., a long touch is applied), the controller 180, as illustrated in a second drawing of FIG. 8B, can output detailed information 720 related to the alarm on the touch screen 151. The detailed information 720 can be output on at least part of a display area of the touch screen 151. For example, the detailed information 720 can be output near the first graphic object 710*a* whose output method has changed. When a touch is applied to an arbitrary point of the touch screen 151 while the detailed information 720 is output, the controller 180, as illustrated in the second drawing of FIG. 8A, can restrict the output of the detailed information 720 and restore the first graphic object 710*a* whose output method has changed into the original first graphic object 410.

The controller 180 can also restore the first graphic object 710*a* whose output method has changed into the original first graphic object 410 when a current time arrives at the alarm time. Meanwhile, when the alarm 412 has a voice memo 750 associated therewith, the controller 180 can output the voice memo 750, in response to that a touch is applied to the first graphic object 710*a* with the output method changed and maintained for a predetermined time or more is applied (e.g., a long touch is applied). The voice memo 750, for example, can be output through the audio output module 152 (see FIG. 1A).

Afterwards, the controller 180 can output notification information (at least one of an alarm sound, a vibration and a voice memo) when the current time arrives at the alarm time corresponding to the preset alarm. Meanwhile, the controller 180 can restrict an output of the notification information even though a current time arrives at the alarm time when a graphic object whose output method has changed is restored to an original graphic object.

Also, the controller 180 can control the notification information 412, which has been output at a position corresponding to the alarm time, to disappear in response to that the first graphic object 710a whose output method has changed is restored to the original graphic object 410. This configuration of the present invention provides a UX/UI for notifying that there is a short time left up to an alarm time corresponding to a preset alarm before a current time arrives at the alarm time, and allowing a user to recognize the notification.

Figure 9A:
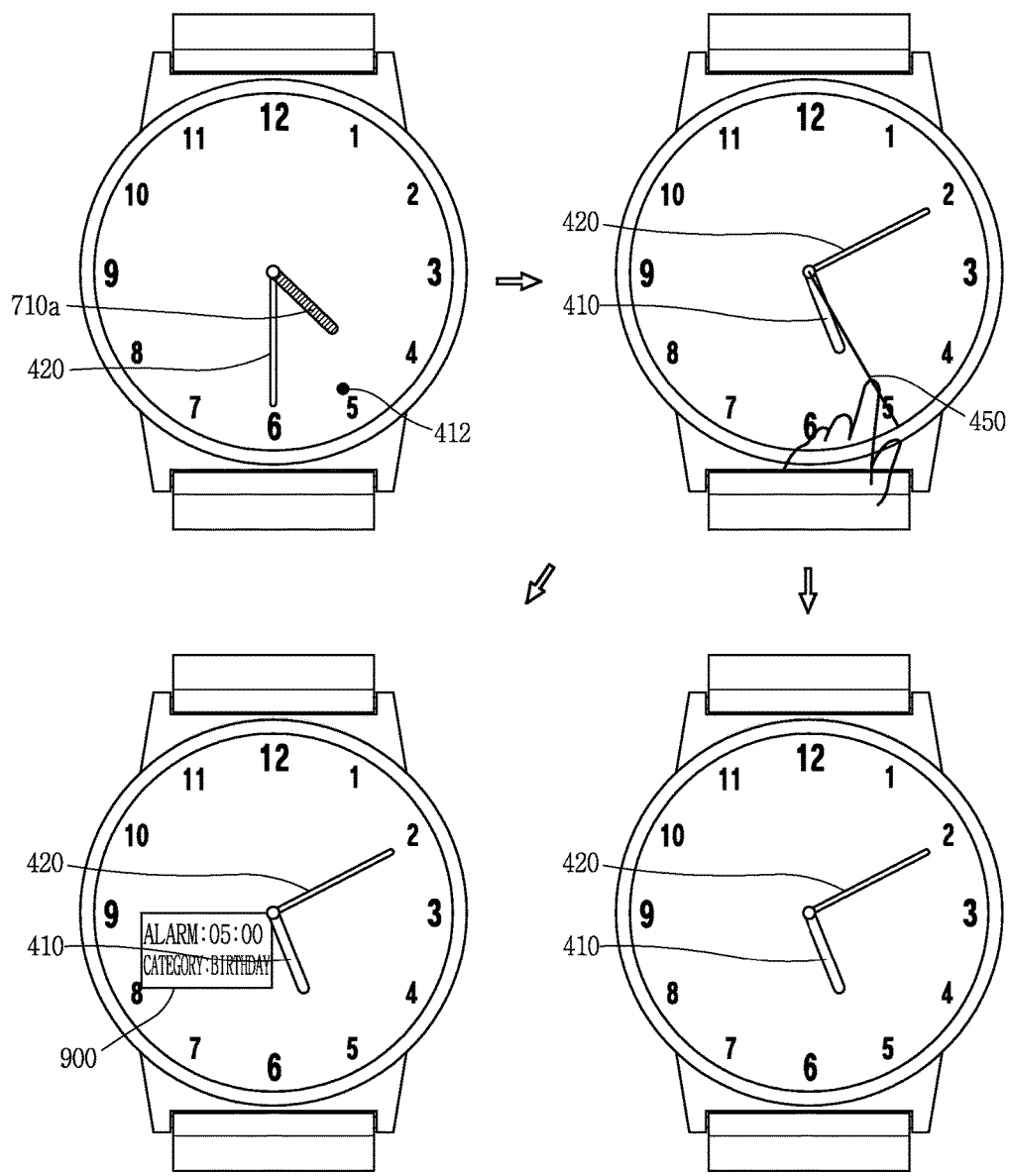
FIGS. 9A, 9B and 10 are conceptual views illustrating a method of controlling a preset alarm.
Figure 9B:
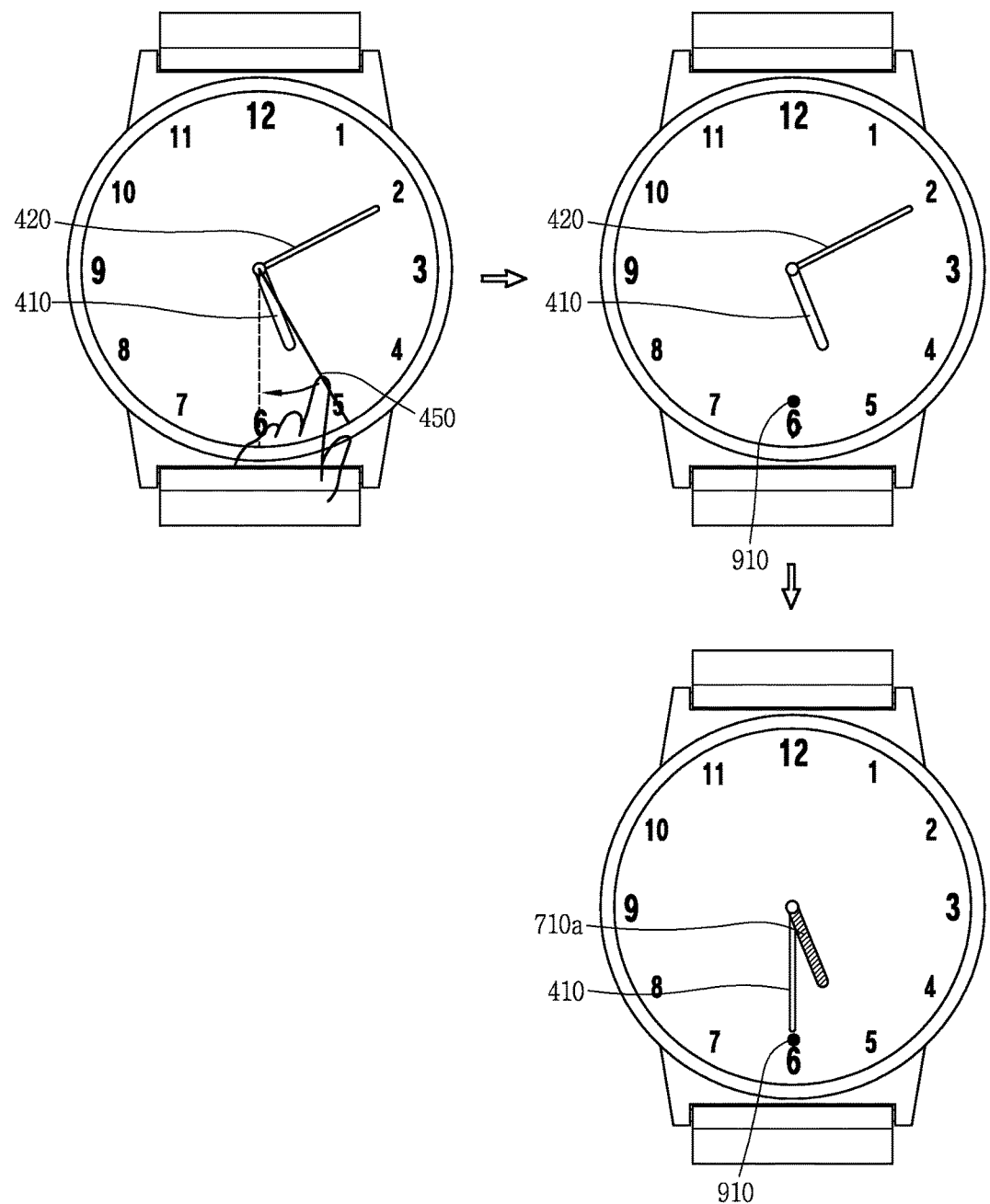
Figure 10:
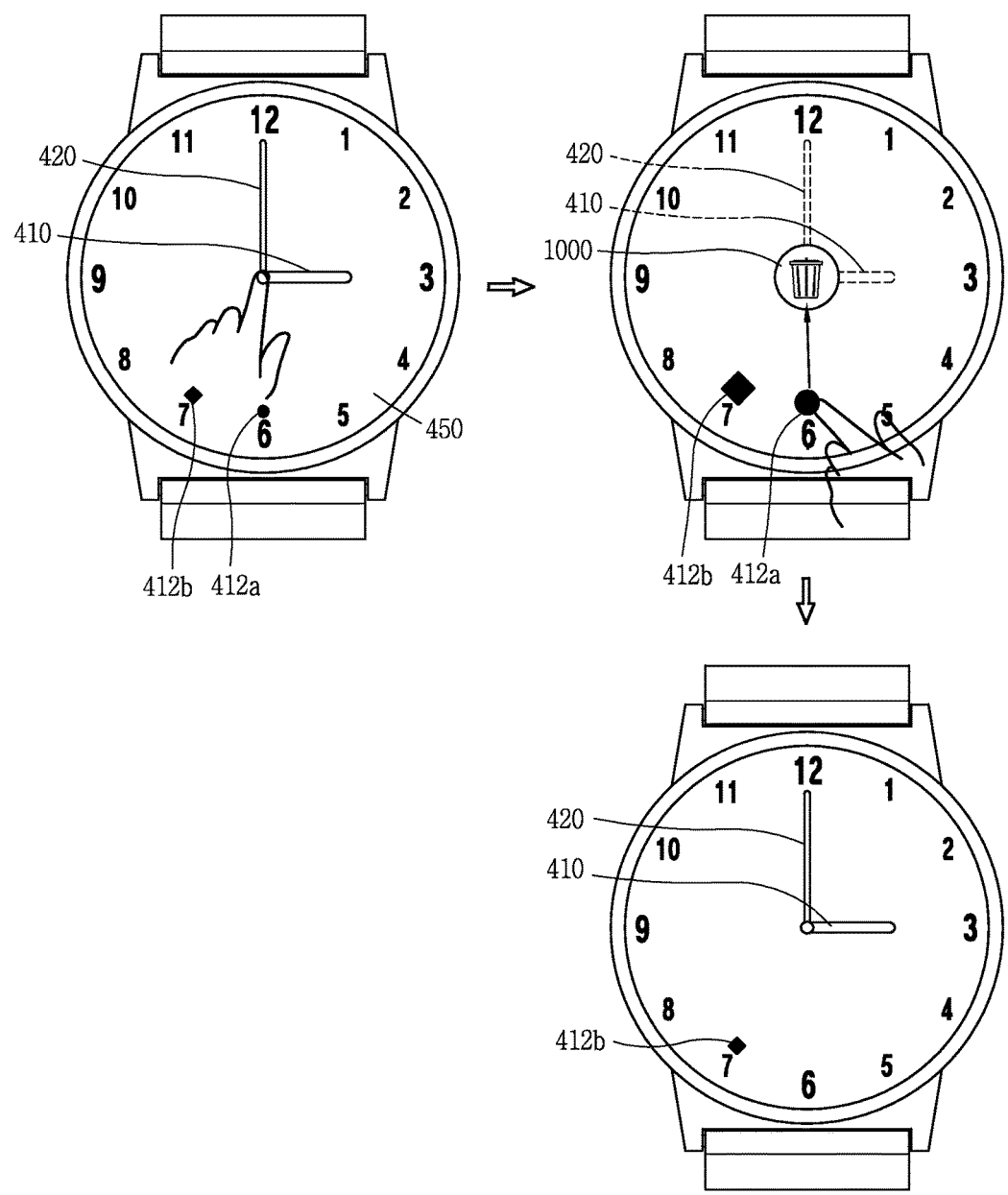

Hereinafter, a method of controlling a preset alarm will be described in more detail with reference to the accompanying drawings. FIGS. 9A, 9B and 10 are conceptual views illustrating a method of controlling a preset alarm. The mobile terminal according to an embodiment of the present invention can output information for guiding an alarm time corresponding to a preset alarm when a touch is not applied until a current time is past the alarm time in a state (710a) that the output method of the first graphic object 410 has changed.

For example, as illustrated in a first drawing of FIG. 9A, when an alarm time corresponding to a preset alarm 412 is 5:00 and a preset time is 30 minutes, the controller 180 can change an output method of a first graphic object in response to that a current time arrives at a time before the preset time from the alarm time.

Afterwards, as illustrated in a second drawing of FIG. 9A, when the current time is past the alarm time, the controller 180 can output information 450 for guiding the alarm time on the touch screen 151. Here, the information 450 for guiding the alarm time can be output when a touch is not applied to the first graphic objet whose output method has changed until the current time is past the alarm time.

Afterwards, when a preset touch (e.g., a short touch) is applied to the guide information 450, as illustrated in a third drawing of FIG. 9A, the controller 180 can control the guide information 450 to disappear. Also, when a preset touch (e.g., a touch (long touch) applied and then maintained for a predetermined time or more) is applied to the guide information 450, as illustrated in a fourth drawing of FIG. 9A, the controller 180 can output detailed information 900 associated with the alarm time.

Meanwhile, the controller 180 can change the alarm time using the guide information 450. For example, as illustrated in a first drawing of FIG. 9B, when a drag touch extends, starting from the guide information 450, and then is released at one point, the controller 180, as illustrated in a second drawing of FIG. 9B, can change the alarm time to a time corresponding to the one point. Here, notification information 910 which notifies the changed alarm time can be output at a position corresponding to the changed alarm time on the touch screen 151. Also, once the alarm time changes, the controller 180 can restrict the output of the guide information 450.

Afterwards, as illustrated in a third drawing of FIG. 9B, the controller 180 can change an output method of the first graphic object 410, in response to that a current time arrives at a time before a preset time from the changed alarm time. With the configuration, when a current time is past an alarm time with a user failed to check the alarm, the user can check detailed information related to the passed alarm or change the alarm time in a more convenient manner.

Hereinafter, a method of canceling (deleting) a preset alarm will be described in more detail with reference to the accompanying drawings. FIGS. 9A, 9B and 10 are conceptual views illustrating a method of controlling a preset alarm. In an embodiment of the present invention, an alarm can be preset. In this instance, the touch screen 151, as illustrated in a first drawing of FIG. 10, can output thereon notification information 412a and 412b notifying the presence of preset alarms. Also, the notification information 412a and 412b cannot be output.

The controller 180 can cancel (or delete) the preset alarm in response to a preset touch applied to the touch screen 151. For example, as illustrated in a first drawing of FIG. 10, when a preset touch (e.g., a touch (long touch) applied and maintained for a predetermined time or more) is applied to the control point 430 at which the first and second graphic objects 410 and 420 intersect with each other, the controller 180, as illustrated in a second drawing of FIG. 10, can control the touch screen 151 to output the notification information 412a and 412b notifying the presence of the preset alarms.

While outputting the notification information 412a and 412b, the controller 180 can increase an output size of each of the notification information 412a and 412b, in response to a preset touch (e.g., a touch (long touch) applied and maintained for a predetermined time or more) is applied to the control point 430. Also, the touch screen 151 can output thereon an icon 1000 associated with an alarm cancel (delete) function in response to a preset touch applied to the control point 430. For example, the icon 1000 can be output on an output point of the control point 430. That is, the controller 180 can change the control point 430 into the icon 1000.

Afterwards, when a touch starting from the notification information 412a and 412b extends and is released at the icon 1000 (or when a drag touch extends, starting from the notification information, and is released at the icon), the controller 180, as illustrated in a third drawing of FIG. 10, can delete the notification information 412a to which the touch has been applied. With the configuration, the present invention can provide a user interface for canceling a preset alarm in a more convenient manner.

Hereinafter, a method of controlling a second function associated with an alarm using a second graphic object corresponding to a minute hand will be described with reference to FIGS. 11A to 12C. Description will be given of an example in which the second function associated with the alarm, as illustrated in FIG. 4B, is a timer function. However, the present invention is not limited to this, but can also be implemented to perform a first function associated with the alarm, as illustrated in FIGS. 6A to 10, using the second graphic object corresponding to the minute hand according to a user setting. Also, the present invention can perform the second function associated with the alarm, which is to be illustrated with reference to FIGS. 11A to 12C, using the first graphic object corresponding to the hour hand according to a user setting.

Figure 11A:
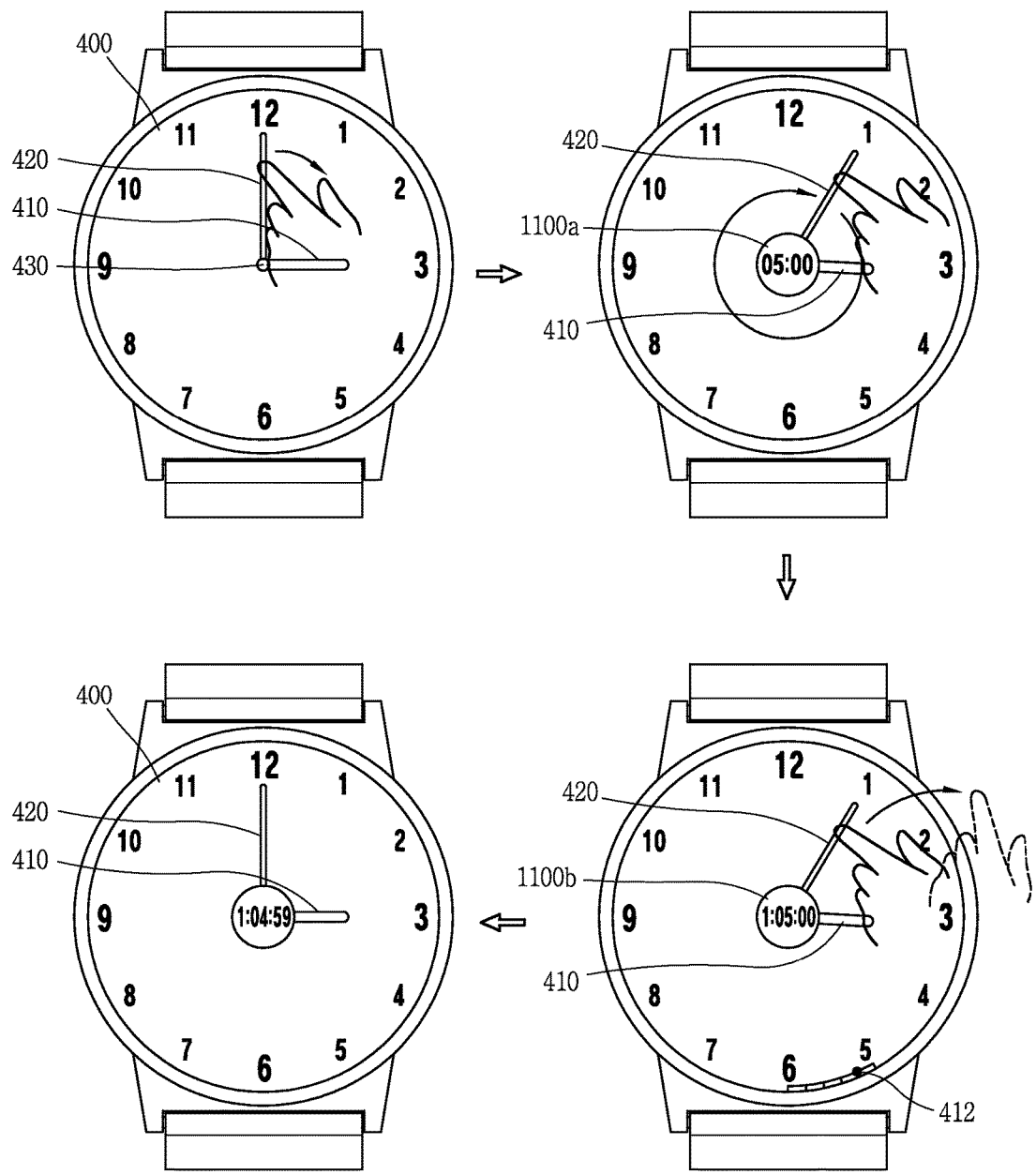
FIGS. 11A to 11C are conceptual views illustrating a method of performing a second function associated with an alarm by using a graphic object corresponding to a minute hand.
Figure 11B:
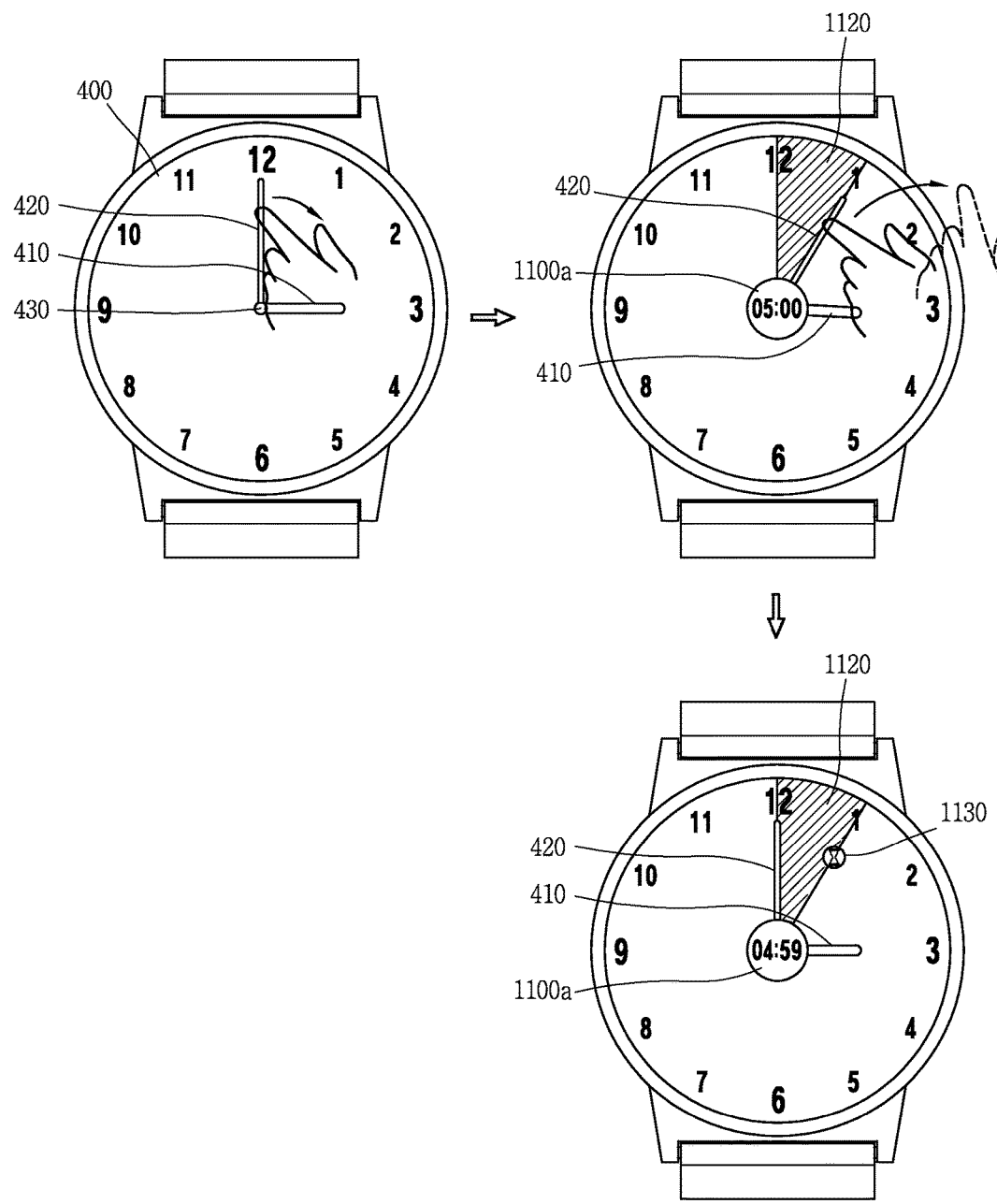
Figure 11C:
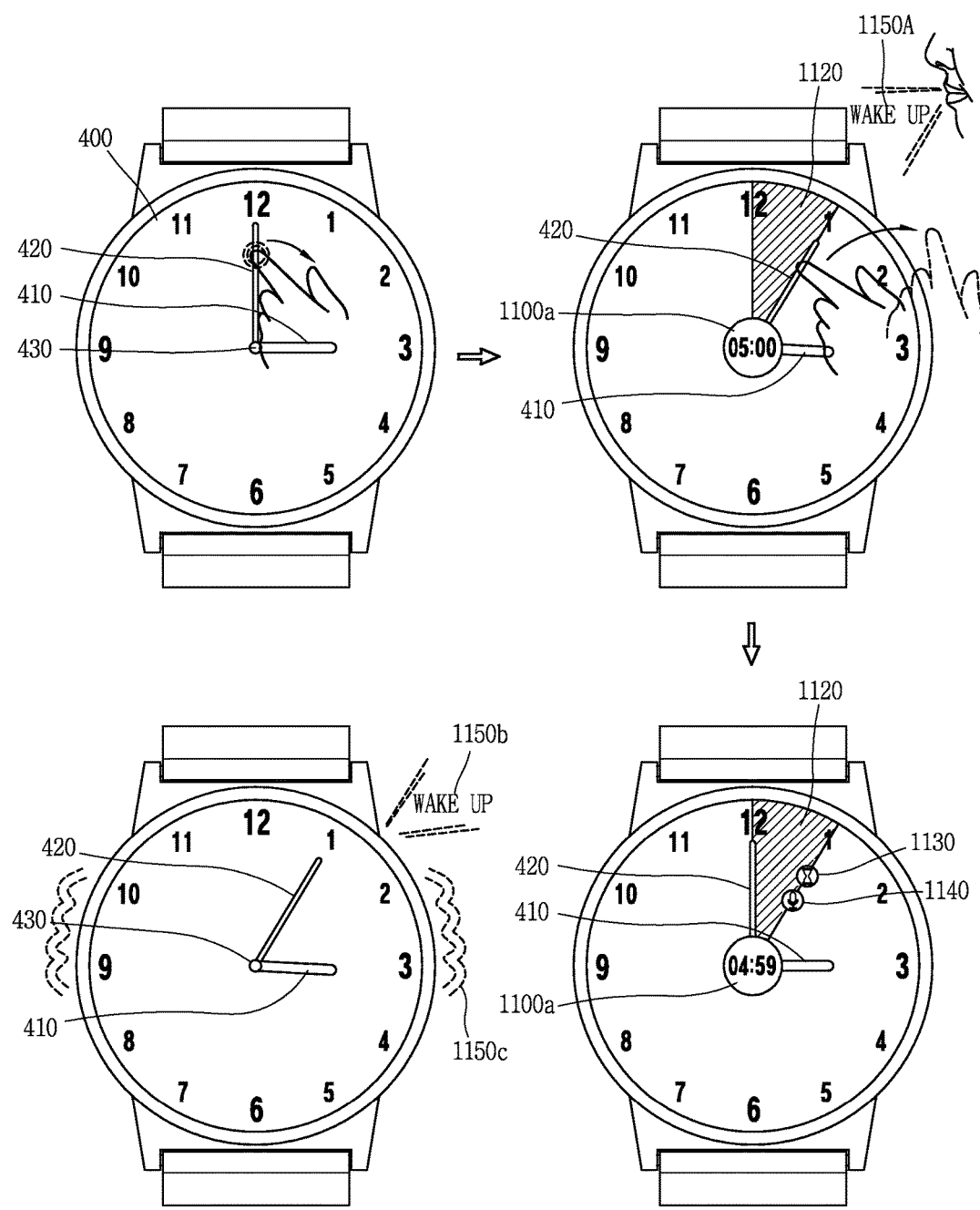
Figure 12A:
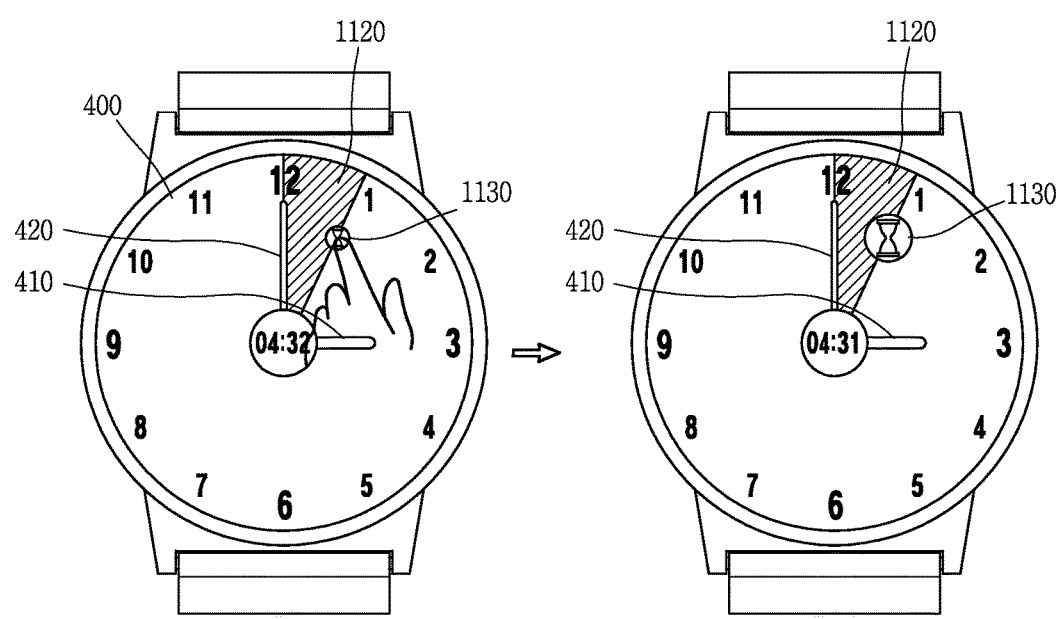
FIGS. 12A to 12C are conceptual views illustrating a method of controlling a second function associated with an alarm.
Figure 12B:
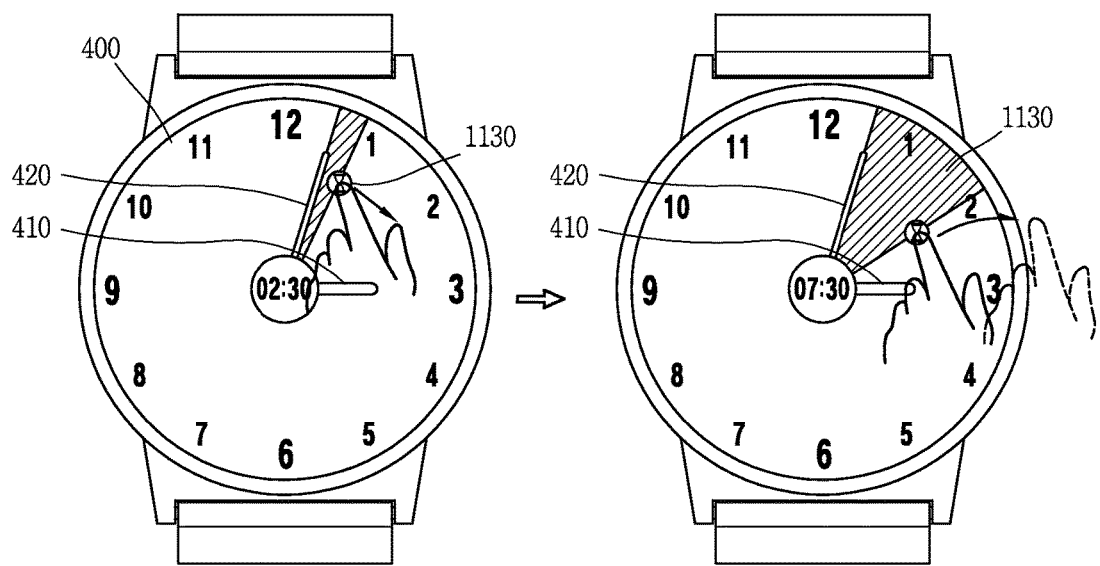
Figure 12B:
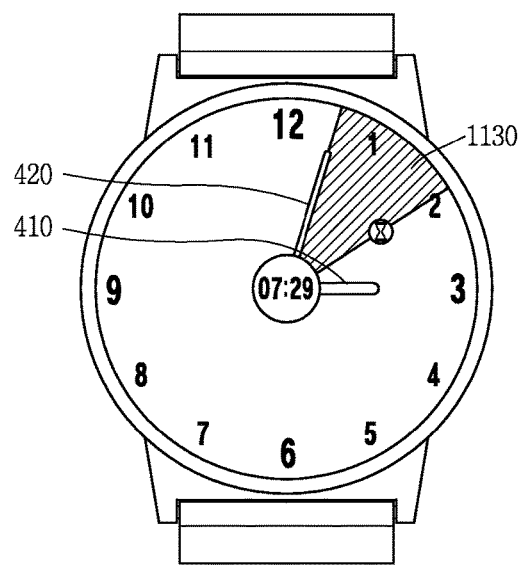
Figure 12C:
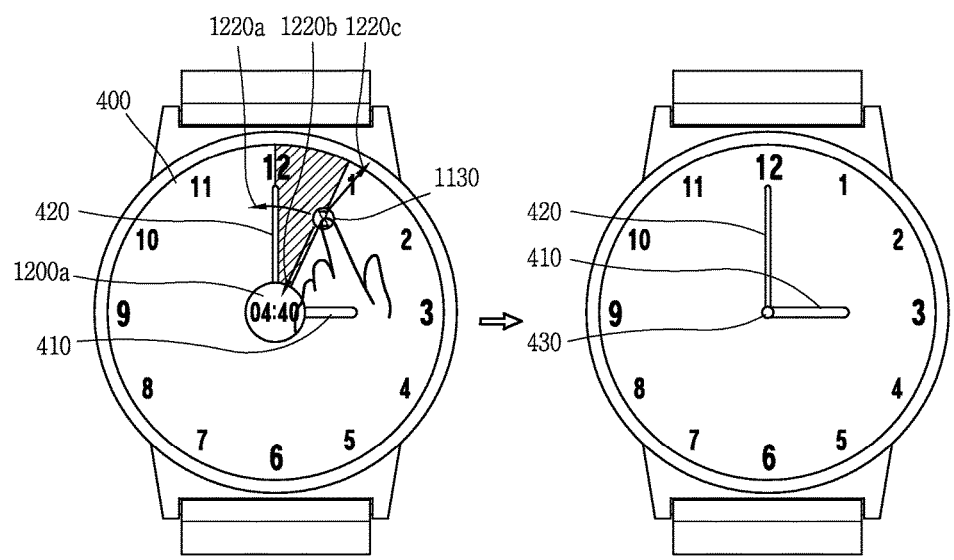

Hereinafter, description will be given of an example of performing a timer function using a second graphic object corresponding to a minute hand. FIGS. 11A to 11C are conceptual views illustrating a method of performing a second function associated with an alarm using a graphic object corresponding to a minute hand, and FIGS. 12A to 12C are conceptual views illustrating a method of controlling the second function associated with the alarm.

In the present invention, a timer function can be performed in response to a preset touch being applied continuously after at least one touch is applied to the second graphic object 420 corresponding to the minute hand (within a reference time after the at least one touch is applied), as illustrated in FIGS. 5A to 5D. Also, the timer function can be performed in response to the preset touch being applied to the second graphic object 420 without the at least one touch. This can be decided by a user setting.

First, as illustrated in a first drawing of FIG. 11A, when a preset touch (hereinafter, a drag touch is exemplarily illustrated) starting from the second graphic object 420 corresponding to the minute hand is applied, the controller 180, as illustrated in a second drawing of FIG. 11A, can change an output position of the second graphic object 410, in response to the drag touch.

Also, while the drag touch is maintained, as illustrated in a second drawing of FIG. 11A, the controller 180 can output time information 1100a between a point at which the second graphic object 420 is located before the drag touch is applied and a point at which the drag touch is located (i.e., a point at which the first graphic object 510 is output). For example, the time information 1100a can be output at the control point 430 at which the first and second graphic objects 410 and 420 intersect with each other.

Meanwhile, when the drag touch is rotated by 360° as illustrated in the second drawing of FIG. 6A, the controller 180 can output time information 1100b with one more hour. With this configuration, a user can set a time of the timer (or a timer time) on the hour basis using the second graphic object 420 corresponding to the minute hand.

Afterwards, when the drag touch applied to the second graphic object 420 is released, the controller 180, as illustrated in FIG. 11A, can perform the timer function in response to the release of the drag touch. Here, the controller 180 can start counting for the set time of the timer in response to the drag touch.

Also, the controller 180 can output the second graphic object 420, of which output position has changed by the drag touch, on a position indicating a current time in response to the release of the drag touch. That is, after being moved (rotated) by the drag touch, the second graphic object 420 can be restored to its original position (a point where it was present before the drag touch is applied or a point corresponding to the current time), in response to the release of the drag touch.

Meanwhile, as illustrated in a first drawing of FIG. 11B, when a drag touch is applied to the second graphic object 420 corresponding to the minute hand, the controller 180, as illustrated in a second drawing of FIG. 11B, can change a graphic effect (e.g., a color) of an area 1120 of time-related screen information 400, between a point at which the second graphic object 420 is located and an expiration time of the timer. The area 1120 of which the graphic effect is changed can be reduced in size according to the lapse of time.

Also, the touch screen 151 can output thereon a graphic object 1130 for guiding a timer expiration time to correspond to one point at which the drag touch started from the second graphic object 410 is released. A method of controlling a time of a timer using the graphic object 1130 will be explained later with reference to FIGS. 12A to 12C.

Meanwhile, as illustrated in FIG. 6D, the controller 180 can also store a voice memo during a process of setting a time of a timer using the second graphic object 420 in the mobile terminal according to an embodiment of the present invention. For example, the controller 180 can activate a microphone in response to a touch (e.g., a touch (long touch) applied and thereafter maintained for a predetermined time or more) for selecting the second graphic object 420 as illustrated in a first drawing of FIG. 11C or a preset touch (e.g., a drag touch) applied to the second graphic object 420 as illustrated in a second drawing of FIG. 11C.

The activation of the microphone can be maintained while the preset touch is maintained. That is, the microphone can be converted from an activated state into a deactivated state in response to a preset touch (e.g., a drag touch) applied to the second graphic object 420 being released.

As illustrated in the second drawing of FIG. 11C, when the drag touch is applied to the second graphic object 420, the controller 180 can activate the microphone and receive voice information 1150a input from the exterior. Afterwards, when the drag touch is released from the second graphic object 420, the controller 180, as illustrated in a third drawing of FIG. 11C, can perform a timer function based on a time of the timer set by the drag touch. Here, when the voice information 1150a is received while the drag touch is applied, the touch screen 151 can output thereon an icon 1140 for notifying that a voice memo is in association with the time of the timer. The icon 1140 notifying the association between the time of the timer and the voice memo can be output at or near a point corresponding to the expiration time of the timer.

When a current time arrives at the expiration time of the timer (i.e., counting for the time of the timer has completed) while the voice information 1150a is associated, the controller 180 can output voice information 1150b. Also, the controller 180 can output a notification sound/vibration 1150c when the current time arrives at the expiration time of the timer. Such configuration allows for performing a timer function more easily and intuitively by using a graphic object corresponding to a minute hand.

Hereinafter, description will be given of a method of controlling a timer function using a graphic object which guides an expiration time of a timer, with reference to FIGS. 12A to 12C. In response to a touch being applied to a graphic object 1130 which guides the timer expiration time, the controller 180 can control an output side of at least one of a notification sound, a vibration and a voice memo which are generated when the current time arrives at the timer expiration time.

For example, when a touch is applied to the graphic object 1130 for guiding the timer expiration time, as illustrated in a first drawing of FIG. 12A, the controller 180 can change a size of the graphic object 1130. The output size of the at least one of the notification sound, the vibration and the voice memo can be proportional to a size of the graphic object 1130. The controller 180 can change the size of the graphic object 1130 in a toggling manner. That is, the controller 180 can gradually increase the size of the graphic object every time when a touch is applied. When a touch is applied when the size of the graphic object 1130 matches a preset size, the controller 180 can change the graphic object 1130 into the smallest size which is preset.

Meanwhile, the controller 180 can change the timer expiration time in response to a preset touch being applied to the graphic object 1130 guiding the timer expiration time. For example, when a drag touch extending from the graphic object 1130 is applied, as illustrated in a first drawing of FIG. 12B, and thereafter released at one point as illustrated in a second drawing of FIG. 12B, the controller 180 can change the time of the timer.

As one example, when a drag touch is applied to the graphic object 1130 guiding the timer expiration time while counting the time of the timer by the timer function, the controller 180 can reset a time (7 minutes and 30 seconds), which corresponds to a time between a time (e.g., 3:02:30) at which the drag touch has been applied and a point (e.g., 3:10 (ten after three)) at which the drag touch has been released, as a time of the timer (a timer set time). Afterwards, as illustrated in a third drawing of FIG. 12B, when the drag touch applied to the graphic object 1130 guiding the timer expiration time is released, the controller 180 can start counting for the reset time of the timer.

Meanwhile, the controller 180 can reset a time of the timer, in response to a preset touch being applied to the second graphic object 420 while the timer function is executed. Also, the mobile terminal according to an embodiment of the present invention can reset the time of the timer using the sensing unit 140 (see FIG. 1A). For example, while the timer function is executed, when a preset motion of the mobile terminal is sensed by the sensing unit 140 (e.g., an acceleration sensor, a G-sensor, a gyroscope sensor, a motion sensor, etc.), the controller 180 can reset a time of the timer (timer set time) and start counting for the reset time of the timer.

The preset motion, for example, can include a motion that a main body of the mobile terminal vibrates by a preset number of times, a motion that the main body is moved by a reference distance and returns, a motion that an external force is applied to the main body by a preset number of times, and the like. Here, the reset time of the timer can be a previously-set time of the timer. That is, when a preset motion is sensed during counting of a preset time of the timer (e.g., 5 minutes), the controller 180 can reset the preset time of the timer (e.g., 5 minutes) based on a current time, and start counting for the reset time of the timer.

Meanwhile, the controller 180 can terminate the timer function in response to a preset touch being applied to the graphic object 1130 guiding the timer expiration time. For example, in response to a drag touch starting from the graphic object 1130 being applied in a direction 1220a toward the second graphic object 420, as illustrated in a first drawing of FIG. 12C, the controller 180 can terminate the timer function, as illustrated in a second drawing of FIG. 12C.

Here, after the drag touch is applied in the direction (1120a) toward the second graphic 420, when the drag touch is released on the second graphic object 420 or over the second graphic object 420, the controller 180 can terminate the timer function. When the timer function is terminated, the graphic object 1130 guiding the timer expiration time can disappear, and an area 1220c of which graphic effect has changed can be restored to a state before the graphic effect has not changed. Counting time information 1200a can change to the control point 430 when the timer function is terminated.

As another example, the controller 180 can terminate the timer function when the drag touch starting from the graphic object 1130 is applied in a direction (1220b) toward the time information 1200a that the time of the timer is counted. As another example, the controller 180 can terminate the timer function when the drag touch is applied in a direction 1220c toward an edge of the touch screen 151 and then released at the edge (or a portion near the edge) or comes in contact with the edge.

The controller 180 can also terminate the timer function in response to a preset touch (e.g., a double touch, etc.) being applied to the graphic object 1130. The controller 180 can stop (pause) the counting when a touch is applied to the counting time information 1200a during the counting for the timer time. Afterwards, when a touch is applied to the counting time information 1200a again, the controller 180 can restart the stopped (paused) counting. When the counting is stopped, output positions of the area 1120 with the graphic effect changed and the graphic object 1130 guiding the timer expiration time, both output on the touch screen 151, can change according to the lapse of time.

Besides, the mobile terminal according to an embodiment of the present invention can perform a stopwatch function in response to a preset touch (e.g., a short touch, a touch (a long touch) that is applied and then maintained for a predetermined time or more, a double touch, etc.) being applied to the control point 430. The stopwatch function can refer to a function of measuring an elapsed time according to the lapse of time. The description of the timer function can equally/similarly be applied to the stopwatch function.

As described above, a mobile terminal according to an embodiment of the present invention can perform a different function according to whether a touch is applied to a graphic object corresponding to an hour hand or a graphic object corresponding to a minute hand. In such a manner, the present invention can provide new user interfaces for allowing different functions to be performed according to touches applied to the graphic object corresponding to the hour hand and the graphic object corresponding to the minute hand.

Also, the mobile terminal according to an embodiment of the present invention can be controlled to perform an alarm-related function in response to a touch applied to the graphic objects corresponding to the hour hand and the minute hands. Therefore, the user can perform the alarm-related function more easily and intuitively while the mobile terminal is worn on the user's wrist. This can result in an increase in user convenience and accessibility for the mobile terminal.

Also, the mobile terminal according to an embodiment of the present invention can provide a UX/UI for performing various control functions in relation to an alarm by a more intuitive and easier access method while being worn on the user's wrist. This can result in remarkable enhancement of user convenience.

The present invention can be implemented as computer-readable codes in a program-recorded medium. The computer-readable medium can include all types of recording devices each storing data readable by a computer system. Examples of such computer-readable media can include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer can include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A mobile terminal, comprising:
a main body configured to be wearable on a wrist;
a sensor configured to sense a motion of the mobile terminal;
a touch screen provided on a front surface of the main body and configured to display a first graphic object corresponding to an hour hand and a second graphic object corresponding to a minute hand;
a microphone configured to receive voice information;
an audio output module; and a controller configured to:
perform an alarm function for setting an alarm time on the mobile terminal in response to a first preset touch being applied to the first graphic object, and
perform a timer function for setting an alarm to be output at a timer expiration time on the mobile terminal in response to a second preset touch being applied to the second graphic object,
wherein when a preset motion of the mobile terminal is sensed by the sensor while a timer is counting, the controller is further configured to reset a time of the timer and start counting for the reset time of the timer,
wherein the reset time of the timer is a previously set time of the timer, and
wherein the controller is further configured to:
activate the microphone and receive voice information input from the exterior while the first preset touch is applied to the first graphic object,
when the first preset touch applied to the first graphic object is released, deactivate the microphone and set an alarm based on time information corresponding to a released point of the first preset touch and the voice information, wherein an icon, which notifies that the voice information is stored, is displayed at a point corresponding to the time information on the touch screen, and
output the voice information when a current time arrives at a set alarm time corresponding to the time information through the audio output module,
wherein the first preset touch is a first drag touch starting from the first graphic object and dragging the first graphic object to rotate around an intersecting point of the first and second graphic objects,
wherein the controller is further configured to set the alarm time for the alarm function based on a time indicated by a point when the first drag touch is released,
wherein the second preset touch is a second drag touch starting from the second graphic object and dragging the second graphic object to rotate around the intersecting point of the first and second graphic objects, and
wherein the controller is further configured to set the timer for the timer function based on a time indicated by a point when the second drag touch is released.

2. The mobile terminal of claim 1, wherein the controller is further configured to:
display on the touch screen first time information corresponding to a time indicated by a point where the first graphic object is dragged to by the first drag touch, and
display on the touch screen second time information corresponding to a time difference between a first time where the second graphic object was displayed before the second drag touch was applied and a second time where the second graphic object is dragged to by the second drag touch.

3. The mobile terminal of claim 1, wherein the controller is further configured to:
change a display characteristic of at least one of the first and second graphic objects when a current time arrives at a preset time from the alarm time and according to an importance of the alarm.

4. The mobile terminal of claim 3, wherein the change in the display characteristic includes a change a color or thickness of at least one of the first and second graphic objects, and
wherein when a plurality of alarms are preset, the controller is further configured to output a plurality of colors on at least one of the first and second graphic objects when a current time is past a preset time before the alarm time for each of the plurality of alarms.

5. The mobile terminal of claim 3, wherein the controller is further configured to:
restore the changed at least one of the first and second graphic objects, in response to a touch applied to the changed at least one of the first and second graphic objects.

6. The mobile terminal of claim 3, wherein the controller is further configured to:
display on the touch screen a guide indicating the alarm time when the current time is past the alarm time.

7. The mobile terminal of claim 1, wherein the first preset touch includes one of a touch applied to the first graphic object and maintained for a predetermined time or more, a touch applied to an intersecting point of the first and second graphic objects and extending along the first graphic object, and a touch applied to a preset area on the first graphic object, and
wherein the second preset touch includes one of a touch applied to the second graphic object and maintained for a predetermined time or more, a touch applied to the intersecting point of the first and second graphic objects and extending along the second graphic object, and a touch applied to a preset area on the second graphic object.

8. A method of controlling a mobile terminal including a main body configured to be wearable on a wrist, the method comprising:
displaying, via a touch screen provided on a front surface of the main body, a first graphic object corresponding to an hour hand and a second graphic object corresponding to a minute hand;
performing, via a controller of the mobile terminal, an alarm function for setting an alarm time on the mobile terminal in response to a first preset touch being applied to the first graphic object; and
performing, via the controller, a timer function for setting an alarm to be output at a timer expiration time on the mobile terminal in response to a second preset touch being applied to the second graphic object,
when a preset motion of the mobile terminal is sensed by a sensor of the mobile terminal while a timer is counting, resetting a time of the timer and starting counting for the reset time of the timer, wherein the reset time of the timer is a previously set time of the timer;
activating a microphone and receiving voice information input from the exterior while the first preset touch is applied to the first graphic object;
when the first preset touch applied to the first graphic object is released, deactivating the microphone and setting an alarm based on time information corresponding to a released point of the first preset touch and the voice information, wherein an icon, which notifies that the voice information is stored, is displayed at a point corresponding to the time information on the touch screen; and
outputting the voice information when a current time arrives at a set alarm time corresponding to the time information through an audio output module,
wherein the first preset touch is a first drag touch starting from the first graphic object and dragging the first graphic object to rotate around an intersecting point of the first and second graphic objects, wherein the method further comprises setting the alarm time for the alarm function based on a time indicated by a point when the first drag touch is released, wherein the second preset touch is a second drag touch starting from the second graphic object and dragging the second graphic object to rotate around the intersecting point of the first and second graphic objects, and wherein the method further comprises setting the timer for the timer function based on a time indicated by a point when the second drag touch is released.

9. The method of claim 8, further comprising:

displaying on the touch screen first time information corresponding to a time indicated by a point where the first graphic object is dragged to by the first drag touch; and displaying on the touch screen second time information corresponding to a time difference between a first time where the second graphic object was displayed before the second drag touch was applied and a second time where the second graphic object is dragged to by the second drag touch.

10. The method of claim 8, further comprising:

changing a display characteristic of at least one of the first and second graphic objects when a current time arrives at a preset time from the alarm time and according to an importance of the alarm.

11. The method of claim 10, wherein the change in the display characteristic includes a change a color or thickness of at least one of the first and second graphic objects, and wherein when a plurality of alarms are preset, the method further comprises outputting a plurality of colors on at least one of the first and second graphic objects when a current time is past a preset time before the alarm time for each of the plurality of alarms.

12. The method of claim 10, further comprising:

restoring the changed at least one of the first and second graphic objects, in response to a touch applied to the changed at least one of the first and second graphic objects.

13. The method of claim 10, further comprising:

displaying on the touch screen a guide indicating the alarm time when the current time is past the alarm time.

14. The method of claim 8, wherein the first preset touch includes one of a touch applied to the first graphic object and maintained for a predetermined time or more, a touch applied to an intersecting point of the first and second graphic objects and extending along the first graphic object, and a touch applied to a preset area on the first graphic object, and wherein the second preset touch includes one of a touch applied to the second graphic object and maintained for a predetermined time or more, a touch applied to the intersecting point of the first and second graphic objects and extending along the second graphic object, and a touch applied to a preset area on the second graphic object.

\* \* \* \* \*